US008860834B2

(12) United States Patent
Messina et al.

(10) Patent No.: US 8,860,834 B2
(45) Date of Patent: Oct. 14, 2014

(54) MODULAR APPARATUS FOR DIRECTION

(75) Inventors: Rosario Messina, Capena (IT); Giulio Politi, Rome (IT); Roberto Mazzantini, Rome (IT)

(73) Assignee: Gruppo Comunicazione Italia S.p.A., Rome (IT)

( * ) Notice: Subject to any disclaimer, the term of this patent is extended or adjusted under 35 U.S.C. 154(b) by 731 days.

(21) Appl. No.: 13/056,106

(22) PCT Filed: Jul. 29, 2008

(86) PCT No.: PCT/IT2008/000509
§ 371 (c)(1),
(2), (4) Date: Apr. 4, 2011

(87) PCT Pub. No.: WO2010/013261
PCT Pub. Date: Feb. 4, 2010

(65) Prior Publication Data
US 2011/0176026 A1 Jul. 21, 2011

(51) Int. Cl.
H04N 5/232 (2006.01)
H04N 5/225 (2006.01)
H04N 5/268 (2006.01)

(52) U.S. Cl.
USPC ................ 348/222.1; 348/211.11; 348/722; 348/148; 348/153; 348/159

(58) Field of Classification Search
USPC ......... 348/211.11, 222.1, 148, 153, 159, 722, 348/723
See application file for complete search history.

(56) References Cited

U.S. PATENT DOCUMENTS 5,206,732 A * 4/1993 Hudson .................... 348/211.11
6,061,089 A * 5/2000 Tonkin et al. ............. 348/211.6
6,118,473 A 9/2000 Tsunezune et al.

FOREIGN PATENT DOCUMENTS

JP 61164380 7/1986
WO 99/59337 11/1999

OTHER PUBLICATIONS

PCT International Search Report for PCT/IT2008/000509 filed on Jul. 29, 2008 in the name of Gruppo Communicazione Italia S.P.A.
PCT International Preliminary Report on Patentability for PCT/IT2008/000509 filed on Jul. 29, 2008 in the name of Gruppo Communicazione Italia S.P.A.
PCT Written Opinion for PCT/IT2008/000509 filed on Jul. 29, 2008 in the name of Gruppo Communicazione Italia S.P.A.

* cited by examiner

*Primary Examiner* — Jefferey Harold
*Assistant Examiner* — Jean W Desir
(74) *Attorney, Agent, or Firm* — Steinfl & Bruno, LLP

(57) ABSTRACT

The present invention refers to a modular apparatus for a mobile control room, realized in a flexible manner and such that to be advantageously assembled, continuously modified and provided according to needs and requirements of for example, a client. An important improvement for rendering the directing apparatus modular consists in that several modules are provided and there are inserted inside thereof almost the whole of the apparatuses which are needed for the control of the videocameras (or other functions in the case of different kind of modules); Therefore, the most of the investment is flexible since is moved and incorporated to the same modules.

20 Claims, 42 Drawing Sheets

VTR SYSTEM CONNECTIONS
"VTR"

18 CABLES

6 CHANNELS SLOMO SYSTEM CONNECTIONS
"SLOMO"

37 CABLES

CONNECTIONS FOR A GENERIC SYSTEM INPUT/OUTPUT I/O

CONNECTIONS FOR 12 CAMERA SYSTEMS IN A STANDARD OB-VAN

CONNECTION OF 36 CAMERA SYSTEMS IN A STANDARD OB-VAN

CONNECTION OF TWO SLOMO SYSTEMS IN A STANDARD OB-VAN

LIFITING SYSTEM FOR ONE MODULE

LIFITING SYSTEM FOR ONE MODULE

LIFTING SYSTEM FOR ONE MODULE - INSIDE VIEW

LIFTING SYSTEM FOR ONE MODULE - INSIDE VIEW

VTRs MODULE LOCATION

KERNEL

KERNEL EXTRACTION

BALL BEARING WHEELS MOUNTED UNDER KERNEL

MODULAR APPARATUS FOR DIRECTION

CROSS REFERENCE TO RELATED APPLICATIONS

The present application is the US national stage of International Application PCT/IT2008/000509 filed on Jul. 29, 2008.

DISCLOSURE

The present invention refers to a modular apparatus for a mobile control room, realised in order to be advantageously assembled and provided according to the specific requirements for example of a customer.

As it is well known in the art, for the making of outside TV broadcasting (i.e., on the field where an event has to be broadcasted) nowadays there are provided vehicles specifically equipped, being known as OB-Van (Outside Broadcast Van).

In a OB-Van different sections can be defined:
Cameras Section;
Slow Motion Section;
Recording Section;
Input-Output (I/O) Section;
Monitoring and Setting Section; and
Kernel Section;

The "Cameras" section is the section which provides TV images of the broadcasted event through the cameras; it comprises devices on the broadcasting field (cameras, stands, and accessories thereof) and devices installed onto the OB-Van (processing, monitoring, and controlling central units).

The "Slow Motion" section is the section which allows, and especially in sports broadcasting, the possibility of providing slow playing images sequences in a short period of time and obtained from "live" videocameras shots; this section is installed on board the OB-Van.

The "Recording" section is the section which deals with the recording of the broadcasting; it comprises videorecorders and relevant devices for the watching, the listening, and the control of the formers.

The I/O section is the section which deals with the control of signals coming from the outside environment (i.e., another O/B Van), and to provide signals coming from inside to outside broadcasting networks (i.e., to satellites, other OB-Van, etc. . . . ).

The "Monitoring and Setting" section is the section which allows the specialised personnel operating onto a OB-Van to monitor the audio and the video of different broadcasting and for mixing and alternating the latter, therefore producing one or more paged TV programs (i.e., known in the art as "feed") which are transmitted to the public in a later time. In the Monitoring and Setting section there are installed communication devices (known in the art as "intercom" communications), the latter allowing the broadcasting squad to communicate and in order to coordinate, to exchange information, and to give orders.

The "Kernel" section represents the whole of the central units of a series of devices which process the signals according to need of the operating personnel. For example, to alternate video signals or mixing the same it is widely used a device known in the art as "Video Switcher" (mixer Video). The Video Switcher comprises a main basket where processors, memories and other electronic boards are housed, and one or more operating console wherein the specialised personnel operate. Whereas the console are part of the devices of the "Monitoring and Setting" section, the baskets are integral part to the "Kernel".

The "Kernel" houses signals control and measuring devices, and signal sorting boards (known as "router"), main processing units controlled by remote clients. TV signals are composed by a series of images and by one or more audio signals associated thereto.

In the architecture of a standard OB-Van the above described sections are integrated to a single system connected to the chassis.

The architecture of a standard OB-Van does not count on the classification above disclosed. A OB-Van designer is concerned at first about the safety of transporting the relevant technology, the redundancy thereof, and about the possibility of mounting and by-pass possible failures of a device; at second he is concerned about the necessity of space and ergonomics needed for the production and for the maintenance operations.

A standard apparatus foresees that the route from one device to another can be direct or sectioned by means of electric and/or mechanical isolators, known as "patch panel". Further, these isolators are positioned in different locations according to the function thereof.

As a consequence from the foregoing it derives that in a TV apparatus arrangement in a OB-Van there are cables of different kind and that positively run in all possible logical and topology directions. A standard OB-Van although being wired in the best possible way, it shows a constant bulk of different cables which cover the racks housing the devices, the latter being not concentrated at a specific area but being arranged according to process sections and not in logical assembly areas. This entails that in most of the cases the audio devices are arranged at audio consoles, and the recording and slow motion devices are arranged at relevant work areas, as well as the control electronics of videocameras.

As above illustrated the logical arrangement of the devices up to now does not corresponds to the real morphology of the overall system architecture. In a standard apparatus for the direction it is not possible foresee logical operating areas without taking account the overall ergonomics. From the above it is apparent that in a standard apparatus it is not possible to find and isolate a sub-system, nevertheless only in the case of a single device.

For safety reasons, on board the OB-Van and during the transportation of the electronic apparatuses, for the sake of ergonomics and immediate functioning of the whole system at the end of the trip, it is provided that all electronic devices for the TV broadcasting be fixedly installed on the OB-Van. The design and the making of a standard OB-Van foresee that all the apparatuses and technologies (excluded videocameras, stands, microphones, and accessories to be used in outside broadcasting) be wired to each other and fixedly connected to the racks of the cabin onto the OB-Van itself. Each device it is connected to other devices by a number of audio/video digital and analogical connections. This causes a difficult and a long inserting/extracting operation for each device, which by the way it is practically provided only for maintenance, cleaning or upgrade reasons.

Further, the man skilled in the art will notice that these operations can compromise the life and the reliability of the system, since the same can cause a stress or a wear to the connections, the contacts and the components.

BRIEF DESCRIPTION OF THE DRAWINGS

FIGS. 8A-10: show a module VTR and a module slow connected to the module kernel by means of optical fibres single cable connector;

With reference to FIG. 1, it is schematically shown a generic electronic device 100 for processing a signal for the TV broadcasting. As shown in the figure, the generic device 100 it is shown as a "black box" wherein it is input a video signal 2, an audio signal 3 and a data signal 4. The device 1 processes input signals and send as an output a video signal 5, an audio signal 6, and a data signal 7. Therefore, in a generic device transit video, audio and data signals. It is also provided a simple or redundant power supply 8.

Figure 1:
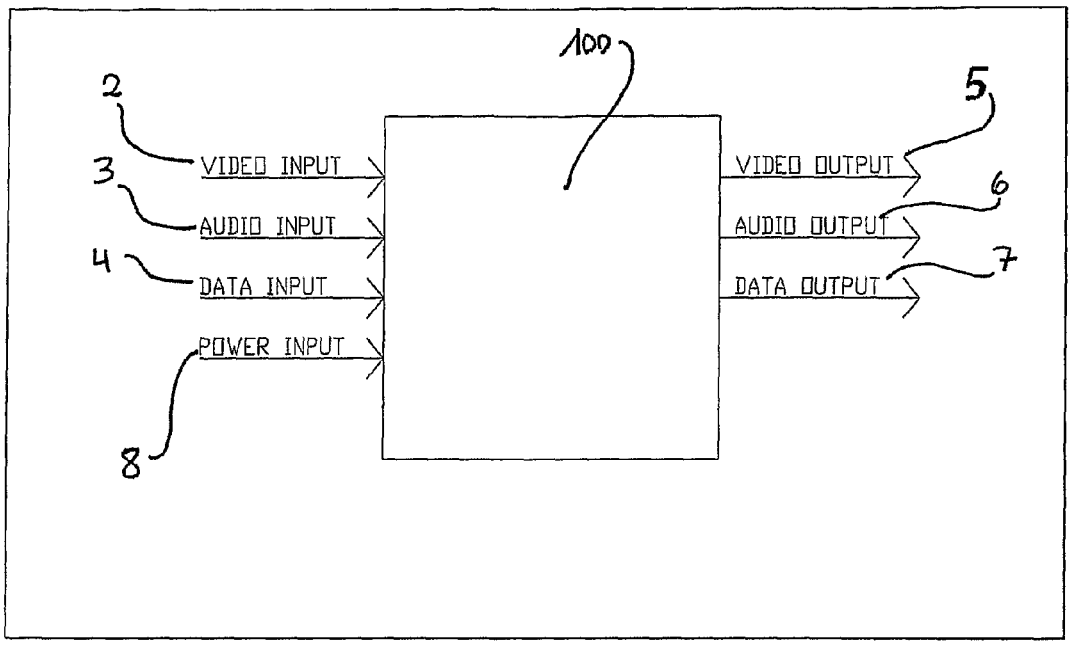
FIG. 1: shows a generic electronic device for processing a signal for the TV broadcasting.

A standard apparatus for directing, being big and complex can be schematically shown as a series of interconnected block diagram and according to FIG. 1.

Figure 2:
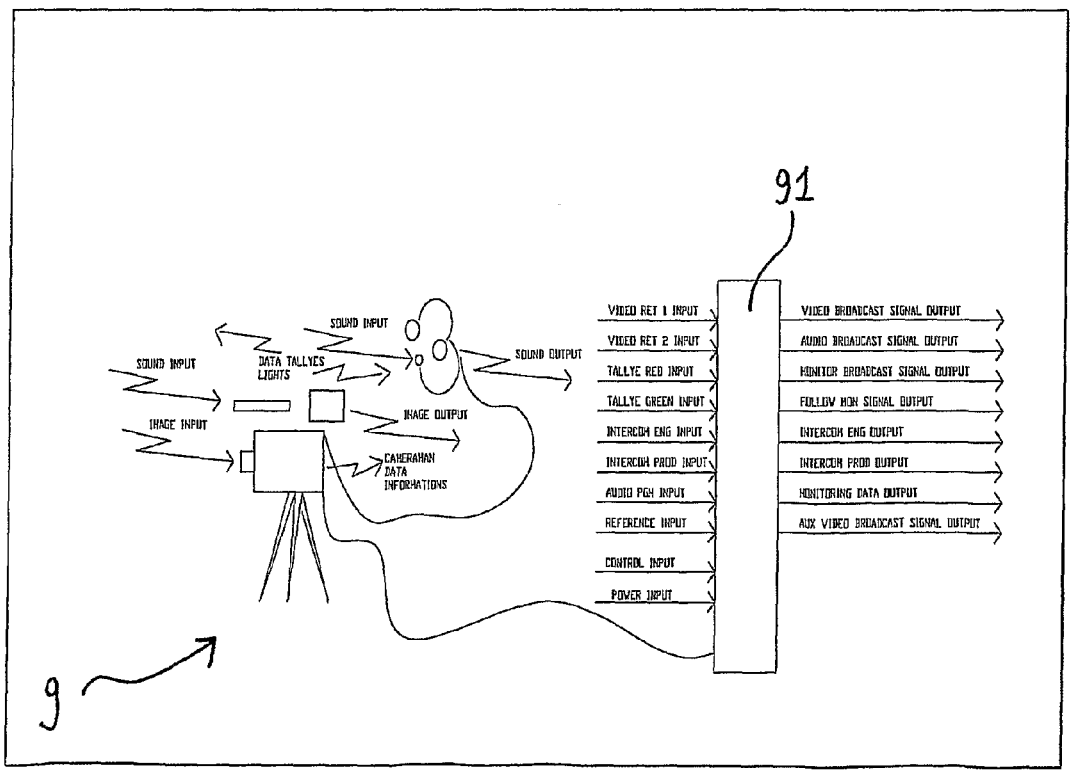
FIG. 2: shows in a detailed manner a typical system relating to a videocamera of the state of the art.

As a way of example, the subsequent FIG. 2 shows in a detailed manner a typical system 9 relating to a videocamera of the state of the art.

With reference to FIG. 2, the videocamera system 9 as it is nowadays realised by the building factories, shows a videocamera part 90 and a device 91 known as Base Station or Camera Control Unit (CCU), to which the former it is connected by means of a single wire (metallic or optical wire).

In the figure, to each arrow input or output to the Base Station 91 corresponds a wire. It is apparent that in order to disconnect a Base Station from a direction apparatus it is necessary to disconnect 18 connectors.

For instance, as a way of a non limiting example, if a producer realises an OB-Van which houses 36 camera systems, it is likely to occur that the mean production entails productions with less than 24 videocameras, and very few productions require 36 videocameras. Therefore, to be immobilised on the OB-Van 36 camera systems instead of only 24 camera systems means that 33% of the whole system be not used and therefore not active.

On the other hand, if it would be decided to connect and/or disconnect 12 camera systems only upon needed, it would entail a connecting/disconnecting step of hundreds of connectors.

Figure 3:
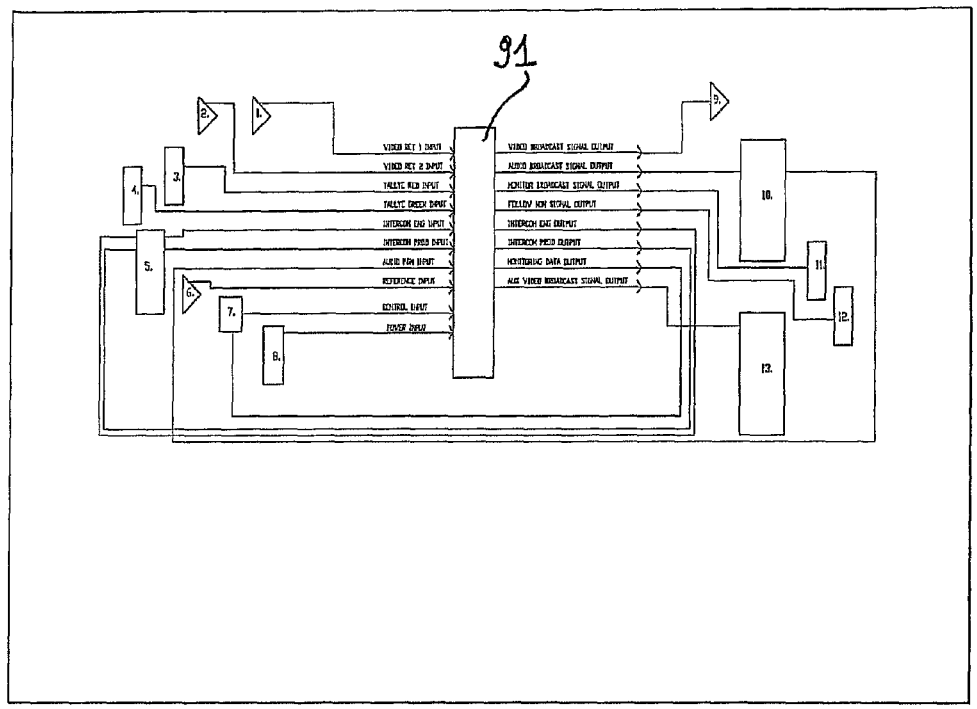
FIG. 3: shows a diagram of a state of the art connection of a Base Station to a standard OB-Van.

With reference to FIG. 3, it is schematically shown a diagram of a state of the art connection of a Base Station 91 to a standard OB-Van, the same will be not further described in detail since already known to a man skilled in the art.

With reference to FIG. 3, it will be apparent to those skilled in the art that all devices related to the cameras system are interconnected to form an architecture of non-splittable apparatuses in a number of sub-apparatuses each independent operating.

Similar considerations may be further highlighted for the other operating parts of standard system of a OB-Van, such as for example the Slow Motion and Recording sections.

The standard OB-Van differ according to the following "categories":

1. Dimensions;
2. Number and arrangement of devices; and
3. Audio and Video formats.

In the market of the "on the field" TV services where it is required the deploy of a OB-Van, the offer it is characterised by the satisfying the required service according to professionalism and experience of a provider; and by the communicating image of the OB-Van deployed which has to be technologically and specifically equipped according to the requirements, nevertheless showing high quality of easiness and comfort.

As above described, to the state of the art it usually happens that the OB-Van be provided with electronic devices that are wired and fixed thereto, but not all of them be used when the event to be broadcasted requires a number of devices which is lower to that available.

Therefore, the choice of what kind of OB-Van has to be deployed it is determined by the kind of the event, by the budget of the client, and by the quality and versatility expectations.

Therefore, the standard apparatuses for the mobile directing have the drawback of not being splittable in a number of subsystems, and therefore not allowing the possibility of a further expansion/upgrade of the same.

Upon designing and realising a mobile control room, the same is defined be the maximum number of videocameras to be deployed (such number, after being decided it will be strictly related to a infrastructure for the recording, for the electronics, the audio, the selection and the communication).

Often, high costing devices are connected to the OB-Van and they do not provide profits since they are not used.

The apparatuses for the mobile directing of the state of the art, usually provide from 2 up to 36 videocameras deployed on the same vehicle. For the sake of avoiding the drawbacks related to small spaces and the transportation thereof, transporting means having a number of videocameras are "mechanically" expansible. In other words, such expandability it is related only to the operating spaces (the chassis), whilst the technological infrastructure it is fixed. When the construction of the vehicle is terminated, the same will be rigidly pre-set to a maximum number of videocameras available.

Such "rigidity" leads to OB-Van having different sizes and different technological apparatuses according to the number of videocameras carried on, for example:
- OB-Van with 2 to 4 videocameras (for News);
- OB-Van with 4 to 6 videocameras (for News/Fiction/Small TV Programming);
- OB-Van with 7 to 10 videocameras (Sport/Music/Events);
- OB-Van with 11 to 16 videocameras (Sport/Concerts/Events);
- OB-Van with 17 to 24 videocameras (International Sport/Concerts/Events); and
- OB-Van with 25 to 36 videocameras (International Sport/Big Events and Concerts).

Such rigidity leads to less profits due to a under dimensioning or an over dimensioning of the OB-Van, since the events to be broadcasted change its typology every week or every day. If the event foresees 8 videocameras but only a 16 videocameras (or worst, 24 or 36 videocameras) OB-Van it is available, all the control devices of the not deployed videocameras will be also immobilised.

As a way of a non limiting example, it will be supposed of having an OB-Van with 24 videocameras, 8 Slow Motion (rallenty) Systems, but required only 12 videocameras and 4 Slow Motion Systems in a standard architecture.

If this OB-Van it will be deployed for a long TV production and it is required a recover of the amount of immobilised technology, in a standard apparatus it will be necessary to unistall twelve base station devices related to the control of relevant videocameras, and four "Slow Motion" devices. Therefore, the specialised personnel further to uninstall well assembled devices in relevant racks, will have to disconnect hundred of cables (and then will have to re-connect the same). While doing this time costing and dangerous operation with reference to the overall quality of the system (the connectors may suffer of malfunction) it may occur some errors in the individual inserting to be found only after a long check-up of the system, and that it would entail a maintenance stop, as well as a production stop when it is not advisable.

These operations are only related to the disassembling of single devices. But the latter in order to be usable for the production, are already inserted in another system of other devices, and therefore they cannot be removed from the system itself. It has been calculated that the value of the latter devices corresponds to the 40% of the value of the former devices, therefore such unemployed devices are a valuable investment which lies immobilised on the OB-Van.

On the contrary, if only two OB-Van equipped with 10 videocameras are available and the event to be broadcasted need 20 videocameras, the job order will be lost. This is true also for other kinds of apparatuses linked to the chassis of the OB-Van (recorders, ralenty, input/output, monitors, etc. . . . ).

The above entails big stresses in order to modify different arrangements in order to satisfy the client's requirements.

Further, complex ordinary and extraordinary maintenance activities are provided, which immobilise the whole apparatus and also other parts that do not need maintenance. Up to now, the OB-Van maintenance foresee the technical stop for some days and sometimes for some months of the whole capital, which entails a long time break even for the profits.

Therefore, the standard architecture of a OB-Van shows the following drawbacks:
- the apparatus it is intrinsically correlated to the vehicle and the maintenance of any part thereof entails the stop of the whole OB-Van;
- the devices housed therein may be removed as a whole and not as a functioning sub-system; the removal of any device for the maintenance thereof or other, entails the whole removal of all cables connected thereto; and
- for the sake of quality it is dangerous to add further devices according to the known mode "Just-in-time" since the amount of cables to be connected is such that a reliable connection is guaranteed, and further requires a longer check-up time for the whole apparatus.

Object of the present invention it is to solve the above mentioned drawbacks of the state of the art, by providing a modular apparatus for a mobile control room as substantially described in the claim 1. Further object of the present invention it is to provide a vehicle for a mobile control room as substantially described in the claim 20.

Secondary features of the present invention are described in the dependent claims. The present invention, solves the above described drawbacks of the state of the art and has a number and apparent advantages.

According to the present invention and as will be better described in the following, the modular apparatus it is constituted by a number of modules interconnected one to each other.

Each module may be easily carried in a safe condition, and it is insertable and removable by means of a single connector, which guarantees safe efficiency and quality. The inserting/removing operation of the modules it is rendered easier in order to provide an easier "Just-in-Time" mode. Further, the modules may be located where necessary and are wholly controlled via remote from the vehicle itself. Furthermore, the modules are considered by the apparatus as standard "black boxes", and they are exchangeable from one vehicle to another one, without the need of complex configurations to be carried out by the personnel.

Therefore, with the present modular apparatus for a mobile control room according to the present invention:
- there are blocked and immobilised at the inner of the control room only the required technologies and as per the client specifications;
- it is possible a quick, safe, and simple re-arrangement of the mobile control room in order to take any opportunity of work, and to make maintenance and upgrading outside the apparatus and which is always functioning;
- the whole wiring is rendered easier, quicker, and suitable for the modifying time needed to change from one event to another one.

The chassis of the vehicle it is chosen only according to the logistics and the ergonomics of the client. The vehicle for a mobile control room which houses the modular apparatus of the present invention show suitable physical sizes (and not technical sizes) according to the logistic of the moving, and it is equipped only subsequently and quickly with the direction apparatus comprising only the needed modules.

With the modular apparatus for a mobile control room according to the present invention the investments are aimed and controlled, and temporary renting of other modules from other modular apparatuses it is possible.

It will be appreciated that the modular apparatus of the present invention entails a standardisation of the processes for the direction, and therefore of all the connecting systems between modules. As it will be better disclosed hereinafter, the modules are designed in order to obtain particular speed, ease and safe handling thereof and transportation (also via air transportation).

It is important to note that the modular apparatus of the present invention can be deployed both in a vehicle for a mobile control room, in order to realise an outside broadcasting, or can be assembled and operate inside a recording studio, therefore breaking the up to now barrier between the OB-Van and TV Control Rooms.

Further, it must be noted that the costs of the modular apparatus of the present invention are competitive with respect to the costs of a standard apparatus, and the investment for the technology for the "Multiplexing" and "Demultiplexing" the signals must be with a cost which is lower to that of the removable modules.

The modular apparatus of the present invention allows to transfer the data, video, and audio signals of 12 cameras on a single cable.

An important improvement of the modular apparatus for the direction consists in having inserted in the modules the whole of the apparatuses needed for the control of the videocameras (or other functions in the case of other kind of modules); therefore, in this way the whole investment is rendered flexible since it is located in the same modules.

The connection of a single cable corresponds to that of hundreds of cables in a standard apparatus. Therefore, a one minute operation will substitute a four days operation of a specialised personnel.

The modular apparatus comprises an integration of the logical/operating sections as before highlighted (Cameras, Slow Motion, Recording, I/O, Monitoring and Setting, and Kernel) each of them being inserted in a relevant standardised module.

Therefore, the modular apparatus comprises a number of modules, also named "mow", that (similar to the LEGO bricks) may be added and alternated in a standard manner, in order to obtain the modular apparatus in the best coherent manner and according to the need of the production.

Each single module contain functional devices (for example, videorecorders, ralenty and slow motion systems, central control units for the setting of the videocameras, input/output systems, signal processing and vision devices, etc. . . . ) which are wired inside rigid housings and interconnected by a single connector, and by a simple and quick connecting operation.

A standard direction apparatus would not allow the same as above, since all different devices therein included are not wired to each other in a manner to constitute a number of sub-systems and provided with a single "gate" for the mutual interconnection. Up to now, in order to obtain from a standard apparatus a sub-system which it is not being used, there is the only possibility of disconnecting all the devices. As aforesaid, this means hundred of cable connections to be disconnected and re-connected.

The vehicle for the mobile control room and the modular apparatus housed therein constitute a single integrated design.

Each module it is designed and built in a mechanical standardised manner. The vehicle for the mobile control room of the present invention it is mechanically designed and built according to shapes and sizes of the modules of the apparatus.

It will be appreciated that the vehicle for the mobile control room of the present invention can be made in different sizes according to a maximum degree of electronics expandability of the modular apparatus housed therein.

The chassis of the vehicle for the mobile control room it is designed with suitable spaces, joints, and servo actuators which allow a perfect and rapid integration (or disinstallation) of the on board modules.

A module can be connected/disconnected in few seconds, and be immediately operating inside of the apparatus, and be built in order to be fully reliable during its transportation. A module can be transferred from a vehicle for the mobile control room to another one and without the long and necessary initialising operations.

After being inserted in the modular apparatus, the module it is immediately identified and operating in the apparatus itself.

The vehicle for the mobile control room (and, particularly the directing operating areas inside thereof) it is designed in order to render the insertion/extraction operation easy. The special mechanical design of the vehicle for the mobile control room and the modularity of the housing for the modules allows a quick inner arrangement of the operating areas for the processing and control of the signals, and in order to obtain maximum "operating comfort".

The structural fixed wiring, i.e. the wiring inside the chassis of the vehicle it is designed in order to have several connection spots for connecting the modules at the housing thereof provided and exchangeable. The connections between modules are obtained via special wiring and by means of single type standard connector.

The modules are therefore realised with hard and transportable structures, and in modular format.

Inside the vehicle for the mobile control room of the present invention, the same it is designed having spaces suitable for housing the modules in a totally integrated manner to the inner chassis.

The vehicle it is designed having specific mechanisms allowing the housing and the moving of the modules.

Working desks inside the vehicle provide modular housings (therefore interchangeable) for the housing of controlling and operating consoles of the devices housed inside the modules.

With the present invention, it will be not evaluated the logistics of a whole vehicle but that of the vehicle and that of the modules housed therein in a separated manner. The transportation of the modules can be realised with small vehicles that quickly may deliver from a vehicle to another apparatuses which are valuable in millions of Euro. The modules may be immediately removed at the end of the production, which substantially differs from the moving of whole standard OB-Van, which entails low speed being a transportation vehicle, and long time lasting dismantling operations.

When one or more modular apparatuses need maintenance, only the modules to be repaired will stop but not the whole directing apparatus.

The modules can be deployed for different vehicles incorporating control rooms (Sharing between vehicles of the same owner, renting between different Service Companies), therefore reducing the the amount of invested capital.

Further, the modules and the chassis of the vehicle for the mobile control room can travel separated via different courier (airplane for the modules and truck for the vehicle) therefore reducing the transfer time.

Figure 4:
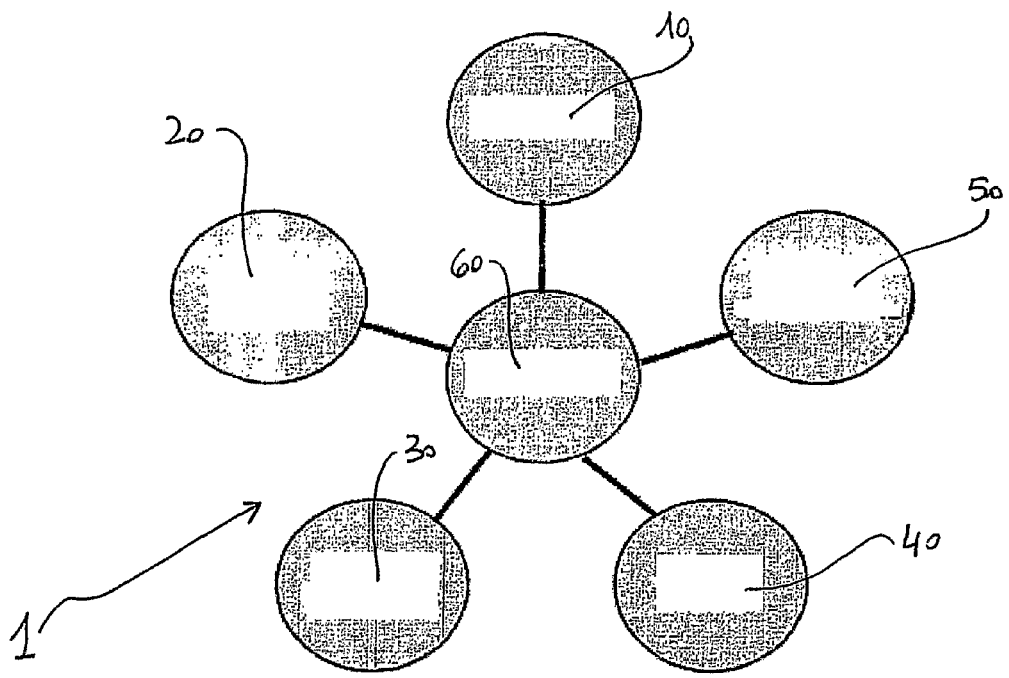
FIG. 4: shows a block diagram of a modular apparatus according to the present invention.

With reference to FIG. 4, it shows a block diagram of a modular apparatus 1 according to the present invention.

The modular apparatus 1 comprises a broadcasting system 10 for an event, and producing an audio/video signal corresponding to the broadcasted event. As it will be apparent, the broadcasting systems may be more than a single one, and according to modes described in a detailed manner hereinafter.

The broadcasting system 10 it is connected to a central control module "kernel", shown in the figure with reference number 60, and for receiving the corresponding audio/video signal produced by the broadcasting system 10.

The modular apparatus 1 further comprises processing modules of the audio/video signal, shown in figure with reference numbers 30, 40 and 50. As it is apparent in figure, each processing module it is only connected to the central control module 60 by means of a "star" connection, and it is provided to a receive-transmit the signal from/to the central control module 60.

As a way of non limiting example, the modular apparatus comprises a processing module 30, named "slow" comprising means for reproducing of the audio/video signal corresponding to the broadcasted event and with different speeds. The slow module 30 it is especially used in sports, for transmitting the replay of important scenes, for example during a soccer match.

The modular apparatus 1 comprises a module 40 named "VTRs", comprising means for the recording of the audio/video signal corresponding to the broadcasted event onto a memory support, and a processing module 50 named "M&S" (Monitoring and Setting), comprising means for operating by mixing of the audio/video signal produced by the camera system 10 in order to realise a TV program up to the public transmission thereof.

Further, the modular apparatus 1 comprises means (located inside the module "M&S" 50 as a non limiting example) for the transmission of control direction signals to the other processing modules and/or broadcasting systems. Such control signals and direction are necessary during the play of the broadcasting, in order to control different treatments of audio/video signal and/or variations during the broadcasting of the event, as desired by the director.

Further to the signal processing modules as above described, the modular apparatus comprises a module 20 named "I/O", being connected only to the central control module 60 and comprising means for receive-transmit by connecting with outside networks. For example, the module "I/O" it is the module through which the event after broadcasting, treating by the modules it is transmitted to the outside.

Figure 5:
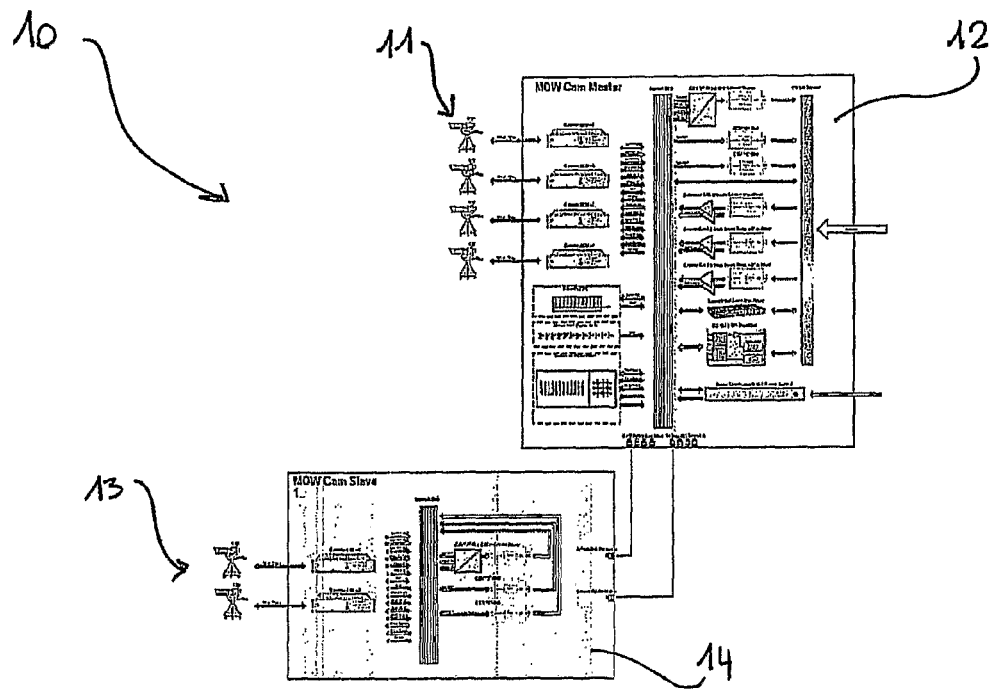
FIG. 5: shows a block diagram of a videocamera system.

With reference now to the subsequent FIG. 5, it is shown therein a block diagram of a videocameras system 10. As shown in figure, the videocameras system 10 comprises a first group of videocameras 11 connected to a respective processing module "cam master" 12 of the audio/video signal corresponding to the scene broadcasted. The processing module 12 it is only connected to the central module kernel (connection not shown in the figure). In the present non limiting example shown here in the figure the first group 11 comprises four videocameras. Furthermore and with reference to FIG. 5, the videocameras system 10 further comprises a second group of videocameras 13, which comprises a pair of videocameras, and each being connected with a module 14 "slave", the latter being connected to the module 12 "cam master" according to a Master-Slave connection. As a way of non limiting example, the module 11 cam master can be connected to a maximum of 4 modules of the "slave" kind, up to process a maximum number of twelve videocameras.

Figure 6:
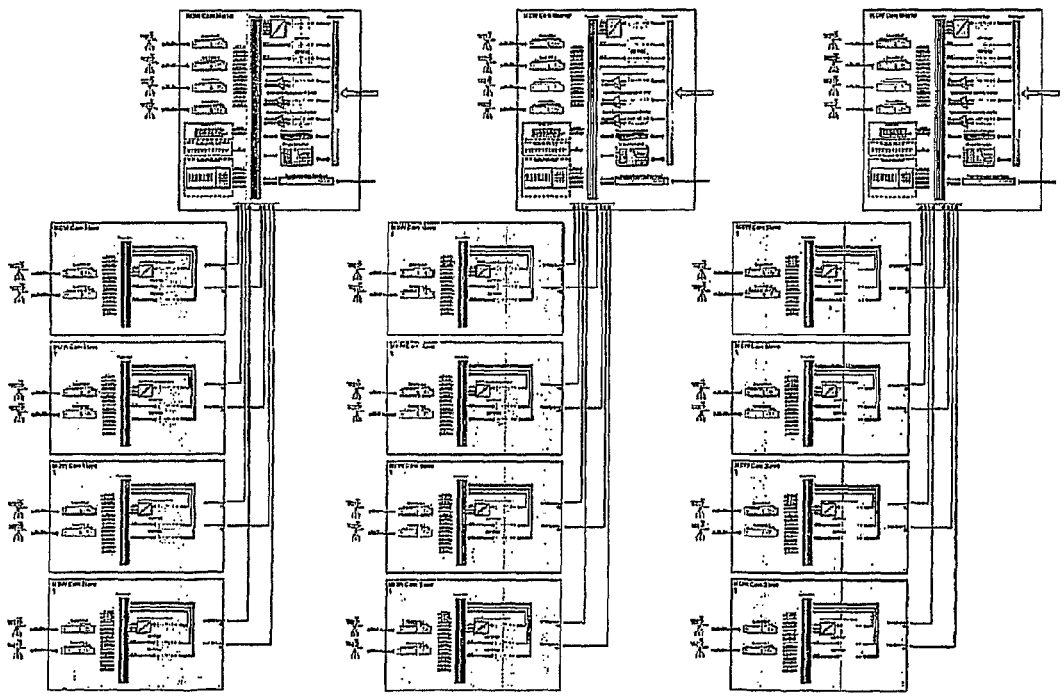
FIG. 6: shows each videocamera system comprising a respective module cam master only connected to a central control module kernel.

The modular apparatus of the present invention may further comprise one or more videocameras systems as shown in FIG. 6, wherein each videocameras system comprises a respective module cam master only connected to the central control module kernel (connection not shown in figure).

The technical requirements for the production of each single module as above described are intended to be easily obtainable for a man skilled in the art, therefore the detailed description thereof will not be given hereinafter.

As a non limiting example, will be provided hereinafter some technical requirements related to preferred technical features for the present modules and used in videocameras systems.

The cam modules may be of three kinds:
cam master module;
cam slave normal;
cam slave s-motion.

The module cam master controls at the inner thereof four camera systems. It may further control four modules SLAVE two of each being S-Motion. The modular apparatus, after being connected to a module cam master, will have control for four up to twelve videocameras. This means that in an upgraded manner, the same apparatus may control from four up to thirty six videocameras (which twelve of said videocameras being a S-Motion).

The electronic features may be so resumed:
four base station hd gv or camera control unit hd sony
total control of further eight camera systems on mow slave
multiplexing audio (four ch) for each video signal hd
intercom onto two stage individually addressed
tally red and green
follow and control and video-pal-monitoring remote onto the apparatus
double video return
change over reference
change over optical signal
insertion of audio signals in a matrix (modular matrix distributed at the inner of said modules and for all the videocameras controlled);
connection to the apparatus by means of a single connector-optical cable "lemo" type (same kind already used to connect videocameras to base stations)
connection to slave modules by means of a connector-optical cable lemo type (same kind already used to connect videocameras to base stations) and a multipolar cable with multiple connector bayonet locking
total control of the power supply of each apparatuses and relevant currents by means of "power-strip-ip"
auxiliary optical connectors for connecting the modules cam slow The mechanical-electrical features are as follows:
15 rack units
depth 600 mm
flight case in shock proof material with handles and tilting wheels for the transportation thereof
weight 100 kg
power supply: 3×6 a 220 V Every electrical signal from/to the module cam it is converted to an optical signal "CWDM".

The system "CWDM" allows to sum in a single optical fibre single mode up to sixteen different optical signals.

For connecting the cam modules to the central control module kernel there are used standard cables-connectors of the same kind of those already used for connecting videocameras to base station. This means that for each cable are available two single mode fibres, therefore thirty two different optical signals "CWDM".

Such thirty two signals in the cable are as follows:
twelve signals HD-VIDEO embedded with four different audio;
two return VIDEO camera signals;
two reference signals having embedded the PGM Audio return;
two VIDEO signals for the monitoring of the control MENU of the videocameras;
eight signals HD-VIDEO for the separate feed for four CAM Sufor Slomo;
four signals for the connection of the Base Device of the Audio Matrix;
two signals for the back/forth Ethernet 1 Gb connection;

Through an Ethernet connection (without the need of using CWDM channels) the following operations are actuated:
control of Tally red and green;
control of the Follow-Camera-Control;
control and monitoring of the Power Streep IP;
connection of all the Remote Controls of the videocameras;
control of the video matrix slaved to the monitoring of the control menu of the videocameras.

The modules "star" arranged with respect to the central control module kernel are connected thereto by a single cable connector.

Figure 7:
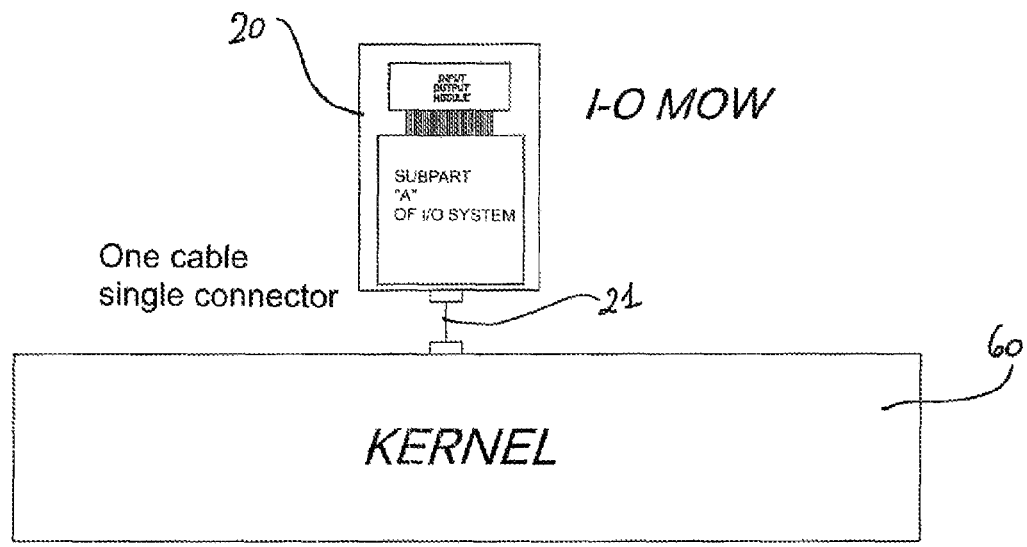
FIG. 7: shows a module connected to the module kernel by means of an optical fibre single cable connector.

With reference to FIG. 7, there is shown the module I/O 20 connected to the module kernel 60 by means of a optical fibre single cable connector 21.

Figure 8:
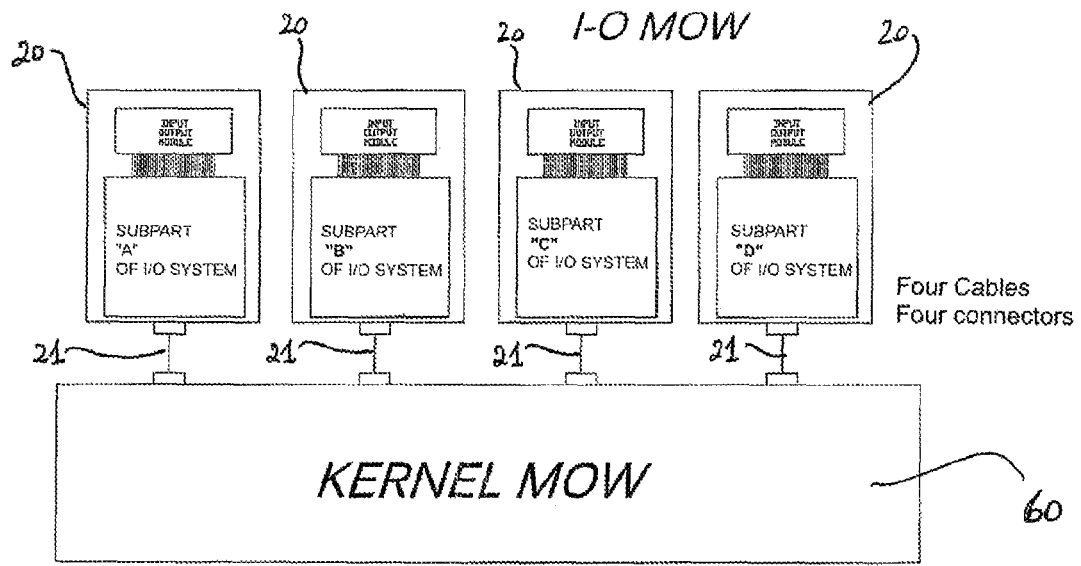
FIG. 8: shows a plurality of modules connected to the module kernel by means of a respective single cable connector.

In FIG. 8 a plurality of modules 20 are shown connected to the module kernel 60 by means of a respective single cable connector 21.

Figure 8A:
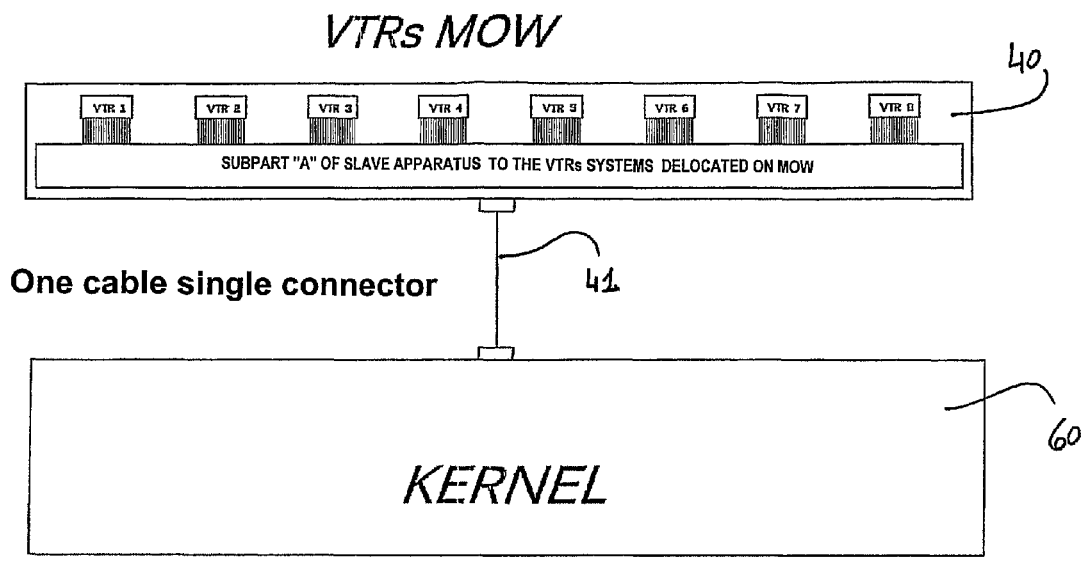
Figure 9:
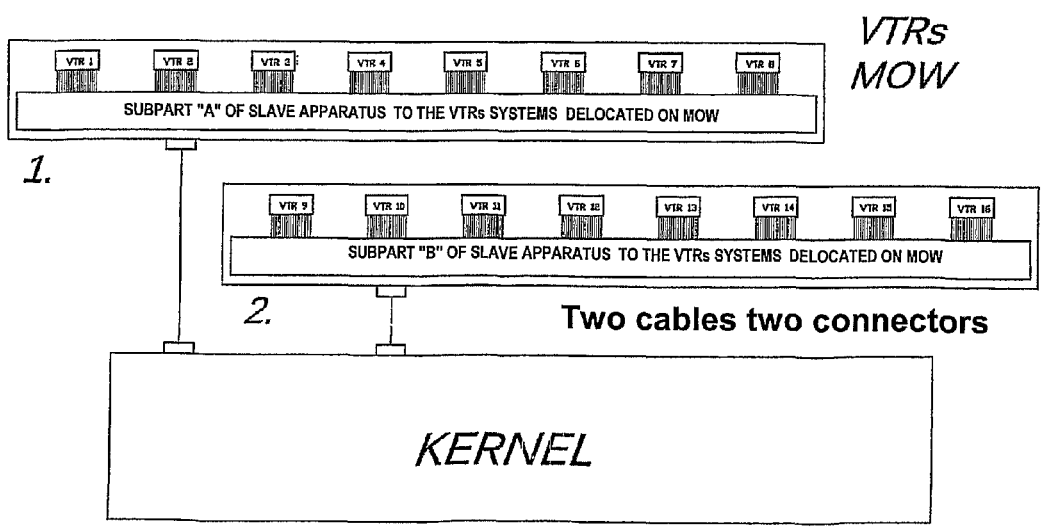
Figure 10:
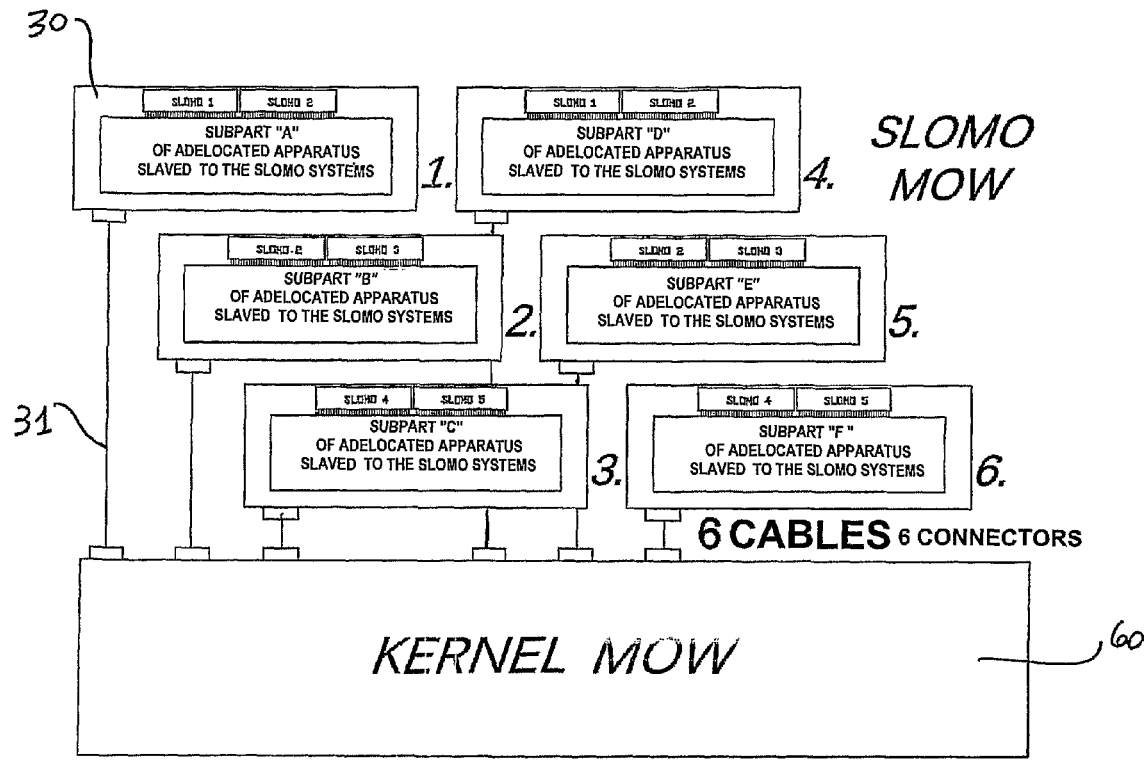

In a similar manner, in FIGS. 8A, 9 and 10 there are shown the module VTRs 40 and the module slow 30 connected to module kernel 60 by means of optical fibres single cable connector 41 and 31, respectively.

Figure 11:
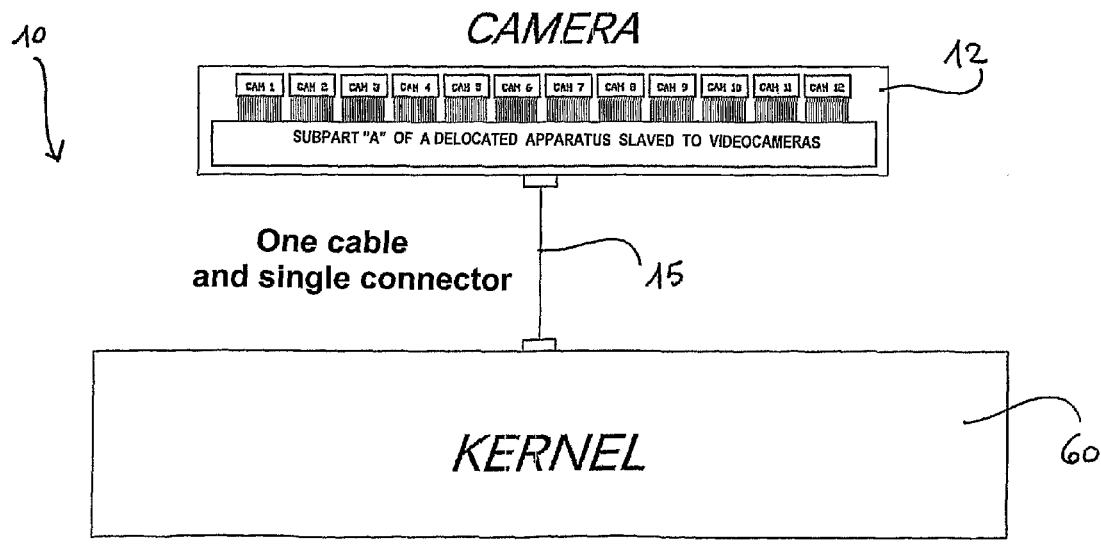
FIGS. 11-12: show videocamera systems, each comprising a module cam master connected to the module kernel by means of a respective single optical fibre cable connector.
Figure 12:
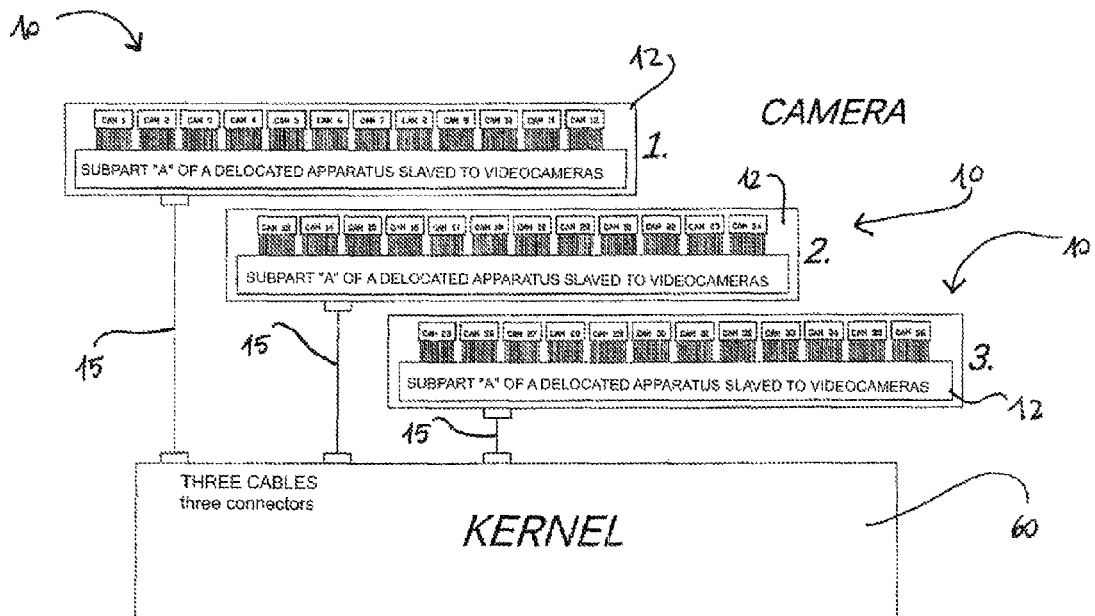

In FIGS. 11-12 there are shown videocameras systems 10, each comprising a module cam master 12 connected to the module kernel 60 by means of a respective single optical fibres cable connector 15.

Figure 13:
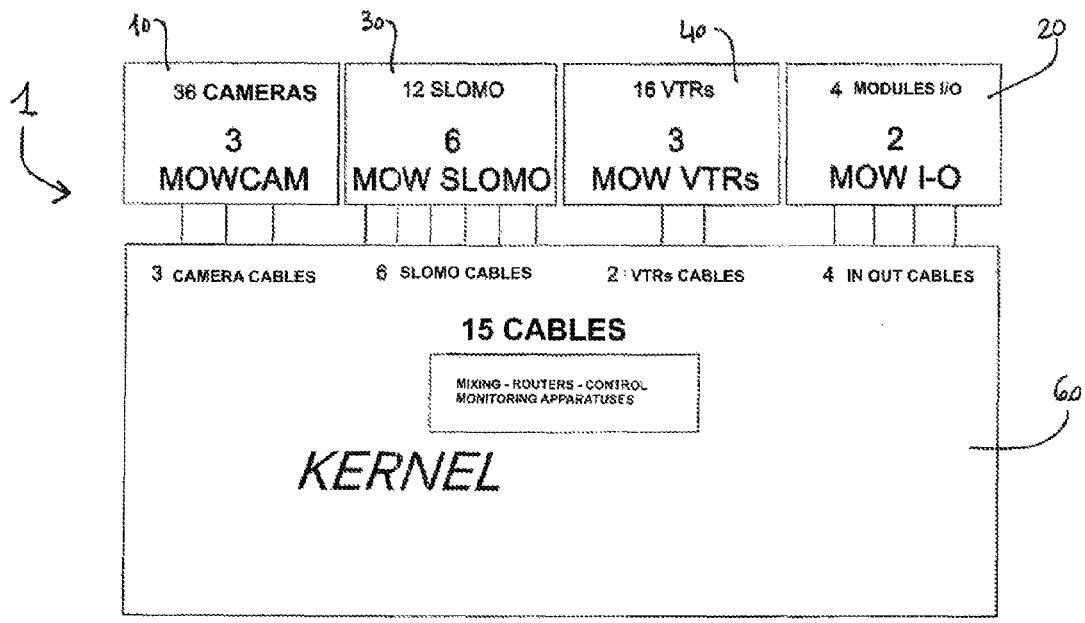
FIG. 13: shows an overall connection diagram. of the modular apparatus according to a present non limiting example it is completely wired by fifteen cables.
Figure 14:
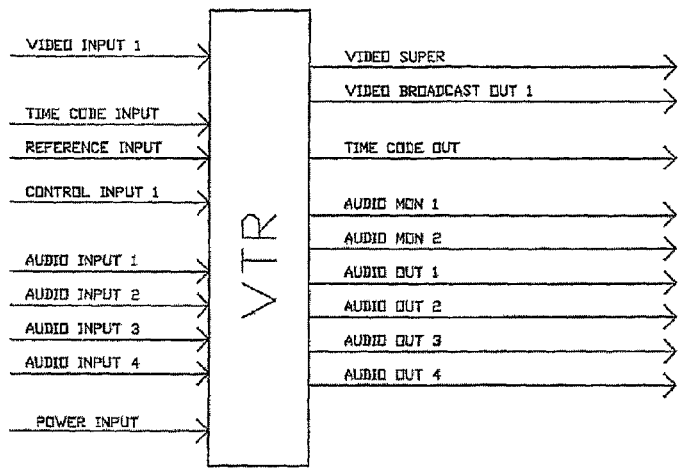
FIGS. 14-25: show connection examples for apparatuses of the state of the art.
Figure 15:
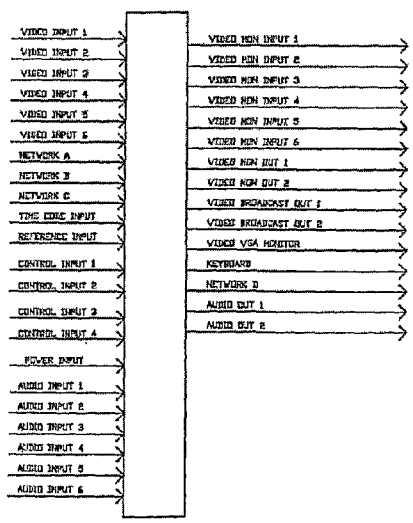
Figure 16:
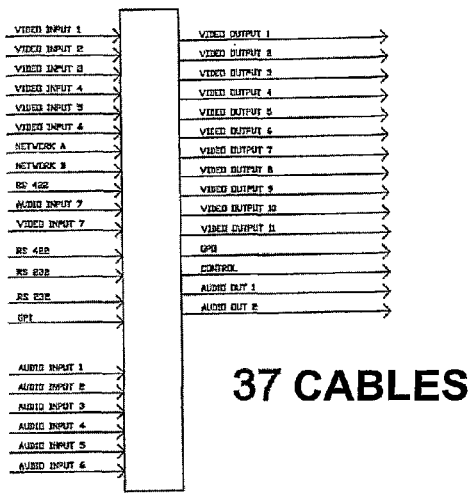
Figure 17:
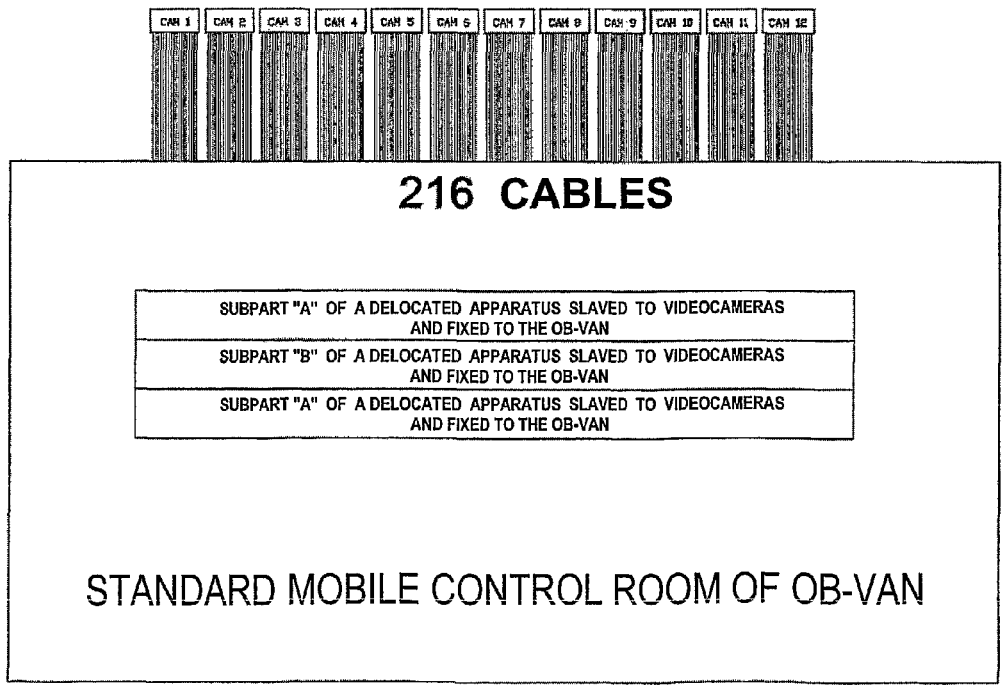
Figure 18:
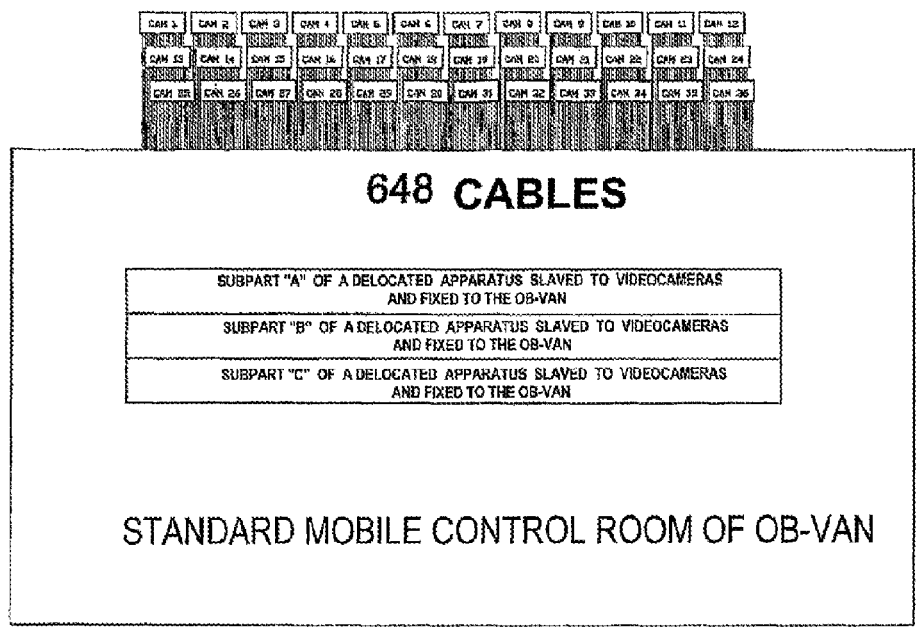
Figure 19:
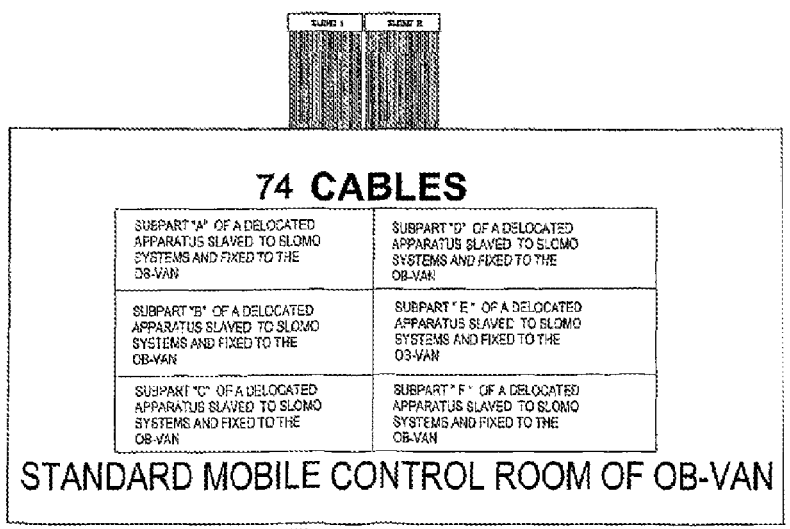
Figure 20:
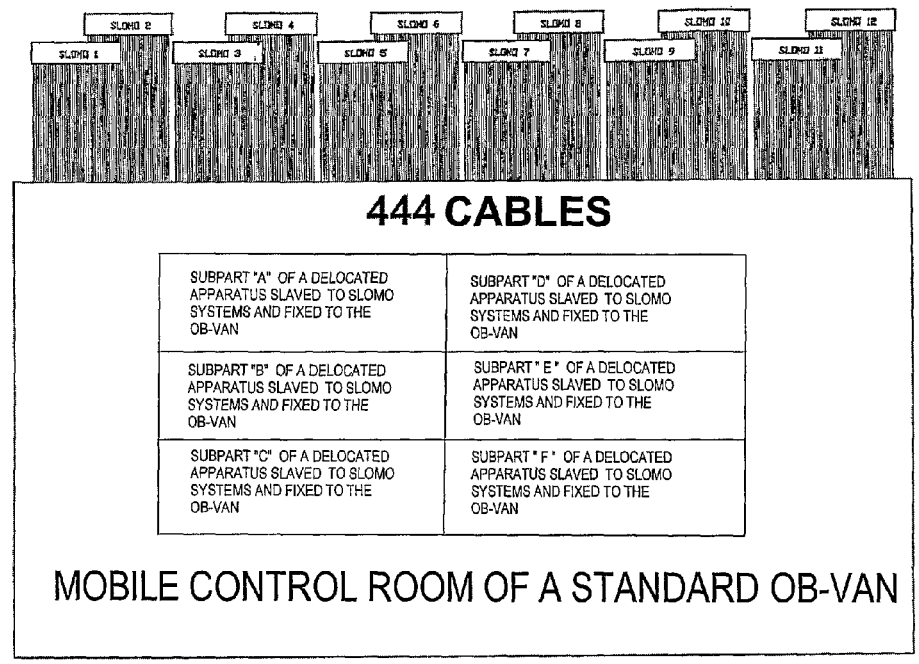
Figure 21:
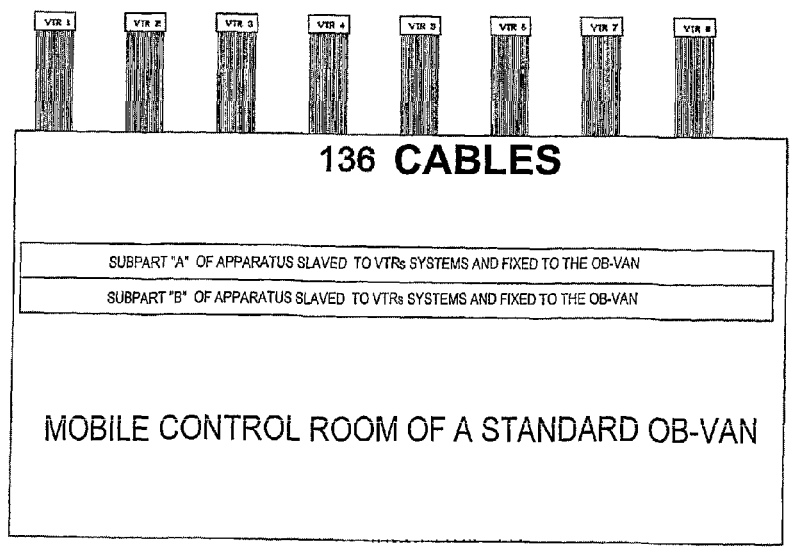
Figure 22:
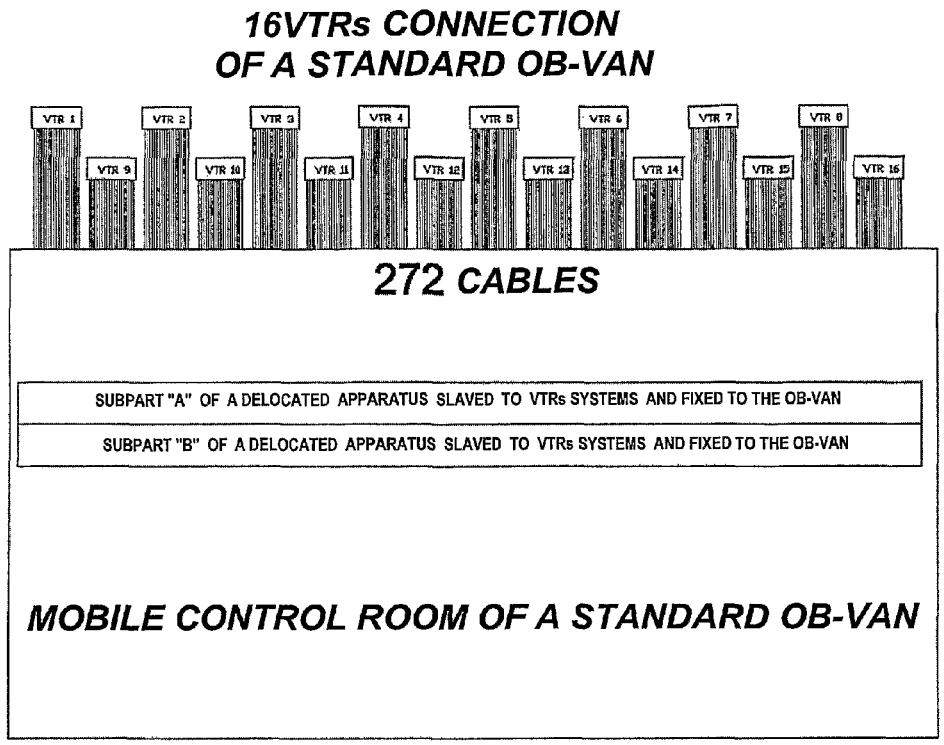
Figure 23:
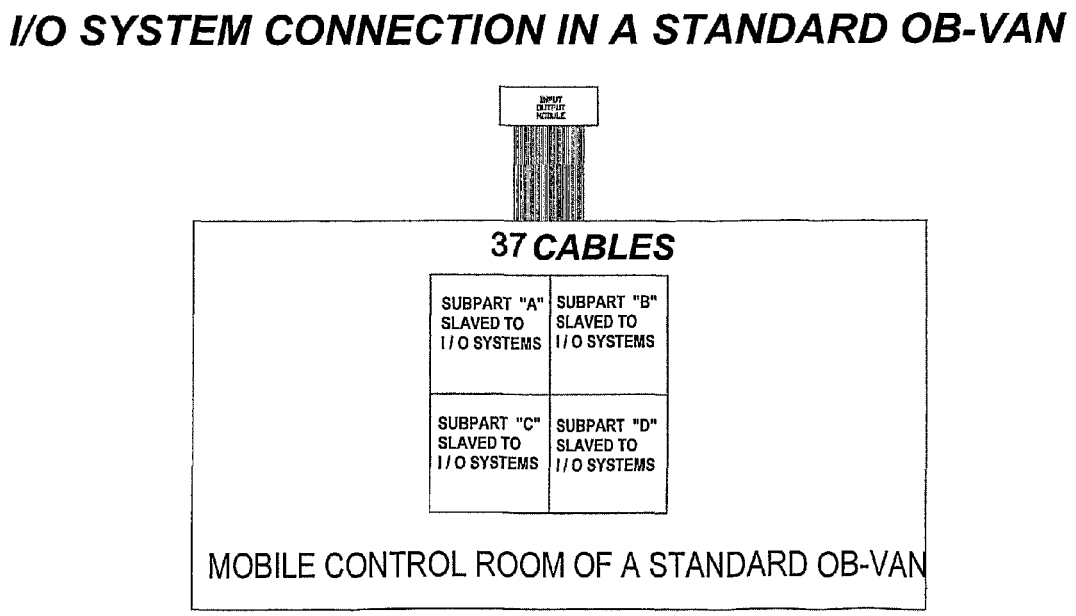
Figure 24:
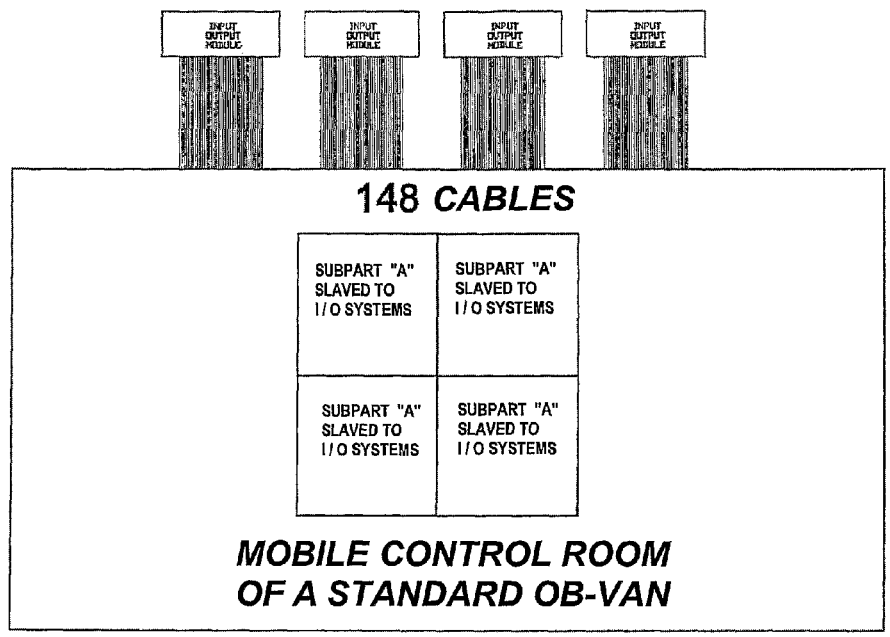

FIG. 13 shows an overall connection diagram of a modular apparatus 1 according to the present invention, and showing that the modular apparatus according to the present non limiting example it is completely wired by fifteen cables, i.e. an extremely lower number of of cables with respect to the number of cables provided in the state of the art apparatuses.

Figure 25:
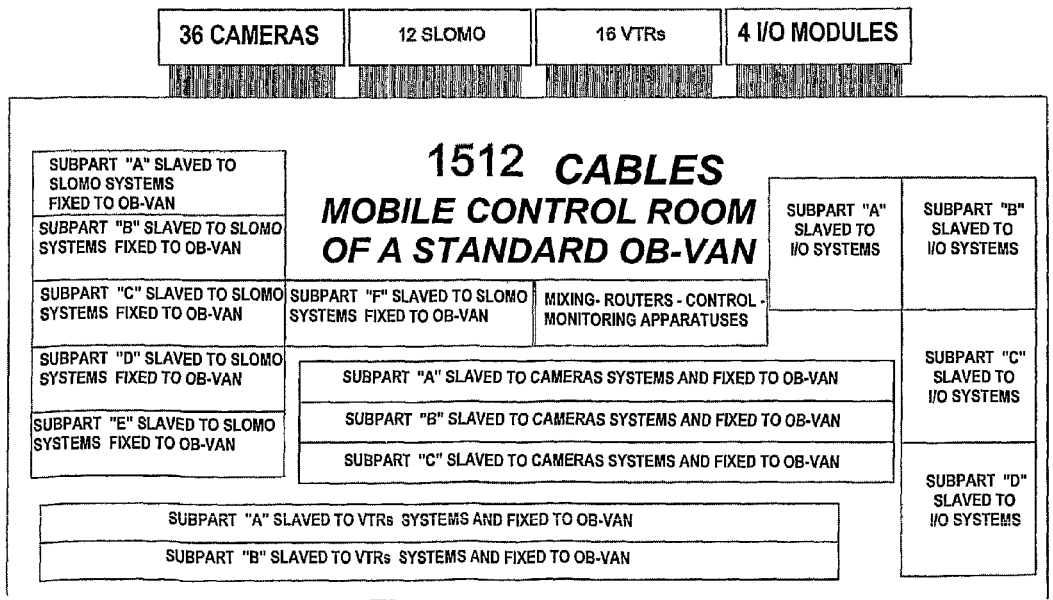

FIGS. 14-25 show connection examples for apparatuses of the state of the art. In particular, the FIG. 25 shows an overall diagram of connecting the apparatus, which highlights the need of connecting about a thousand cables for the assembling of a standard direction apparatus.

Figure 26:
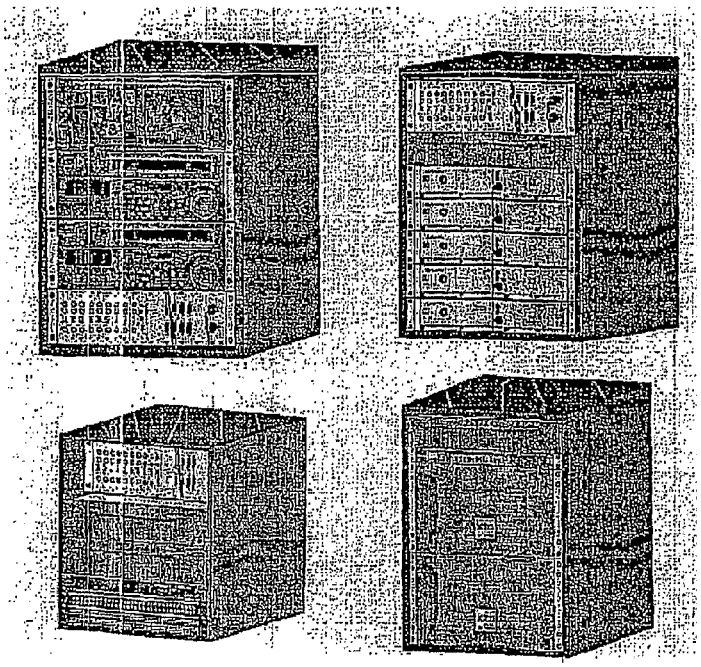
FIG. 26: shows each module of the modular apparatus can be housed inside a respective rigid housing, having a substantially parallelepiped shape, and comprising means for the transportation thereof.

As shown in FIG. 26, each module of the modular apparatus of the present invention can be housed inside a respective rigid housing, having a substantially parallelepiped shape, and comprising means for the transportation thereof. Such means may comprise as a non limiting example one or more wheels at a lower base thereof.

Figure 27:
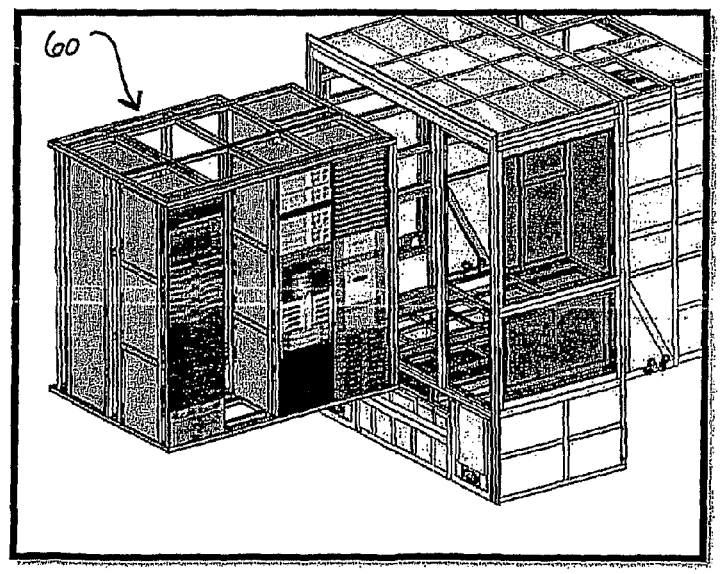
FIG. 27: shows in a perspective view the central control module kernel, housed inside a substantially parallelepiped shaped rigid frame.

With reference to FIG. 27, it is shown in a perspective view the central control module kernel 60, housed inside a substantially parallelepiped shaped rigid frame.

With reference to FIGS. 28-34 there is shown a vehicle for a mobile control room according to the present invention. As it is apparent from the figures, the vehicle according to the invention it is provided for the housing inside thereof of the modular apparatus as above described.

With reference to the figures, the vehicle comprises first spaces each for the housing of a respective processing module, second spaces each for the housing of a respective processing module cam master, third spaces each for the housing of a respective module slave mow, and a fourth space for the housing of a respective module I/O.

Figure 28:
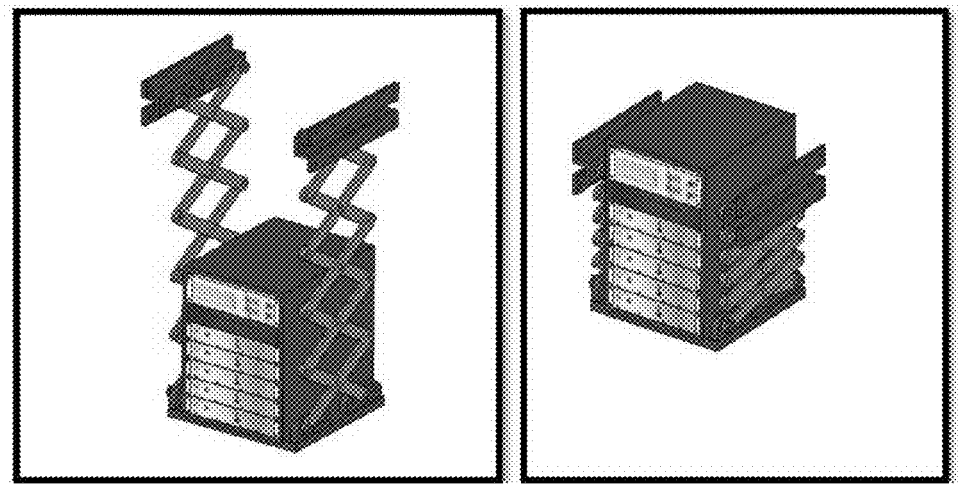
FIGS. 28-35: show a vehicle for a mobile control room.
Figure 29:
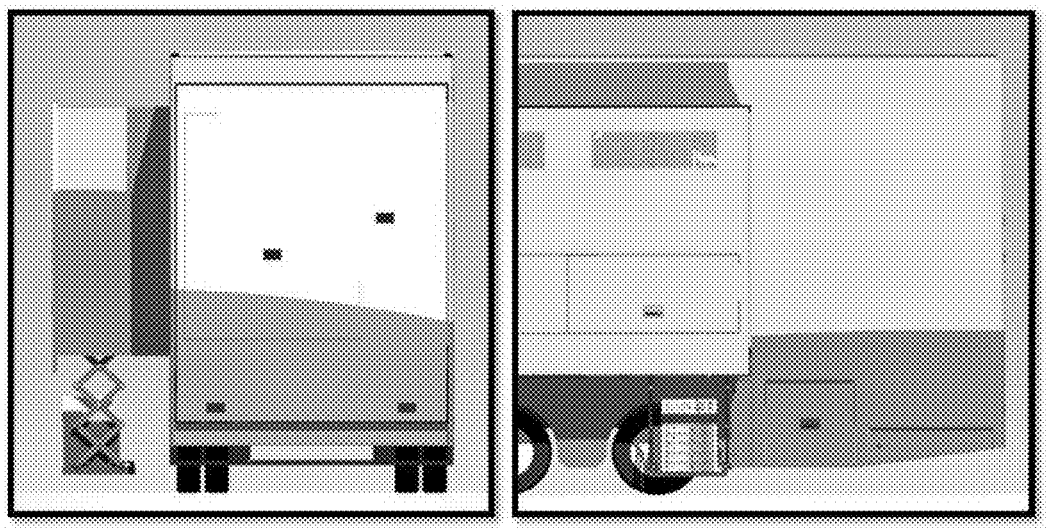
Figure 30:
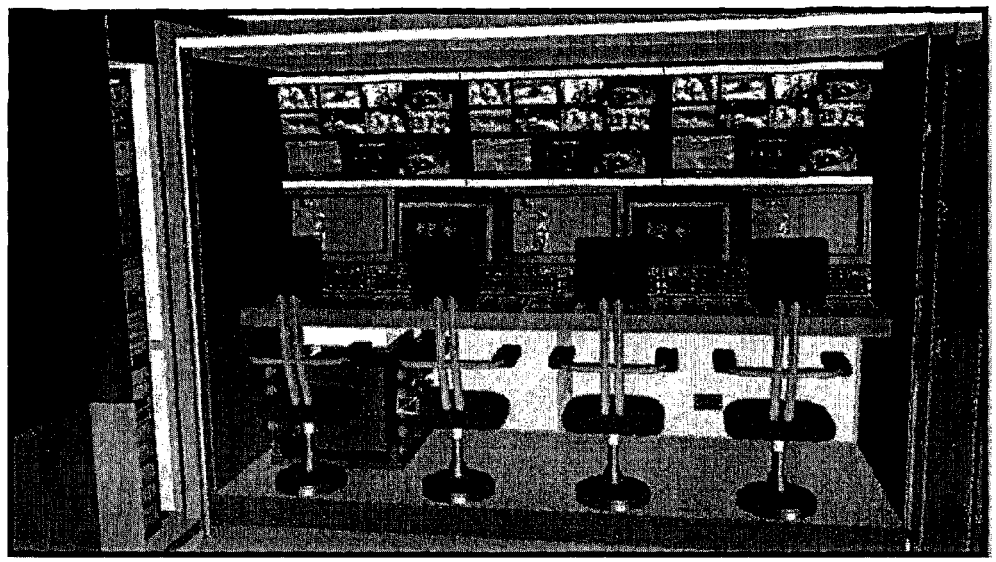
Figure 31:
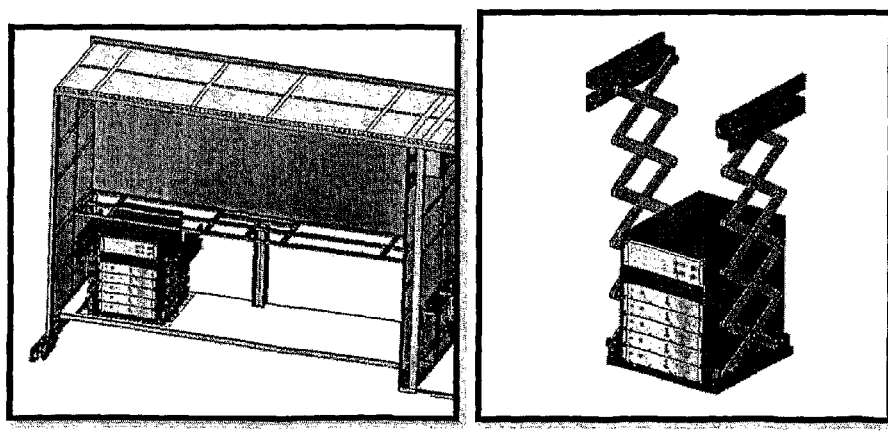
Figure 32:
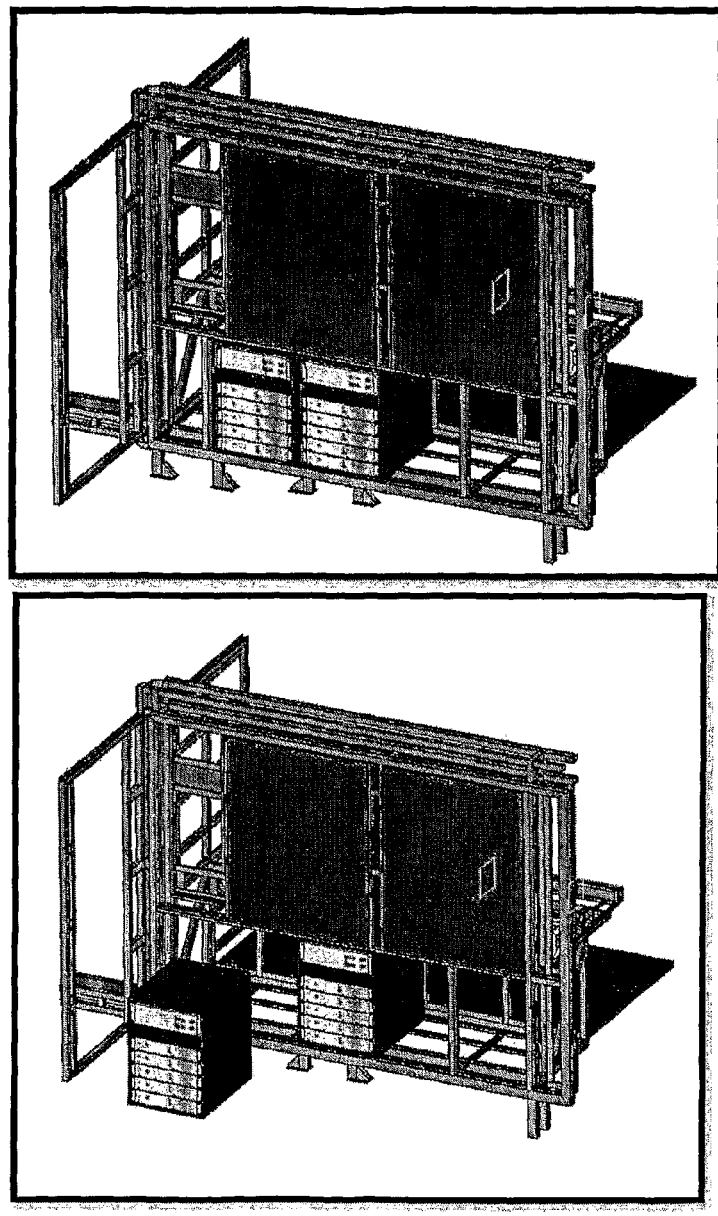
Figure 33:
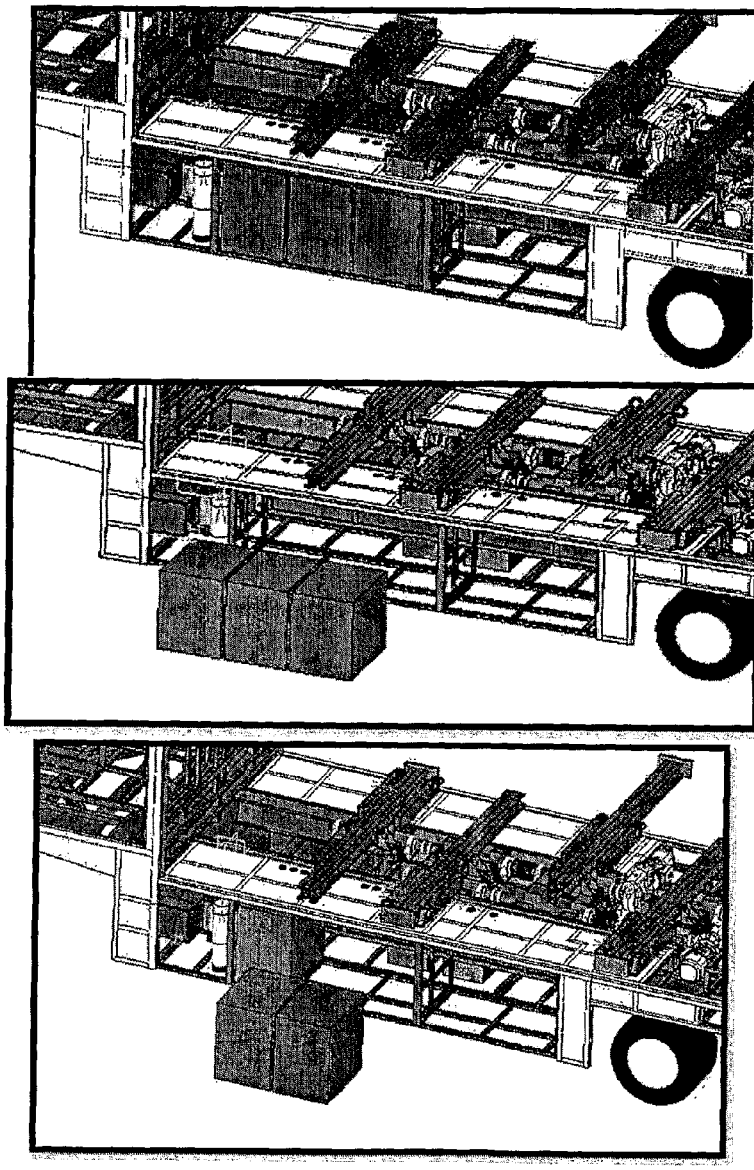
Figure 34:
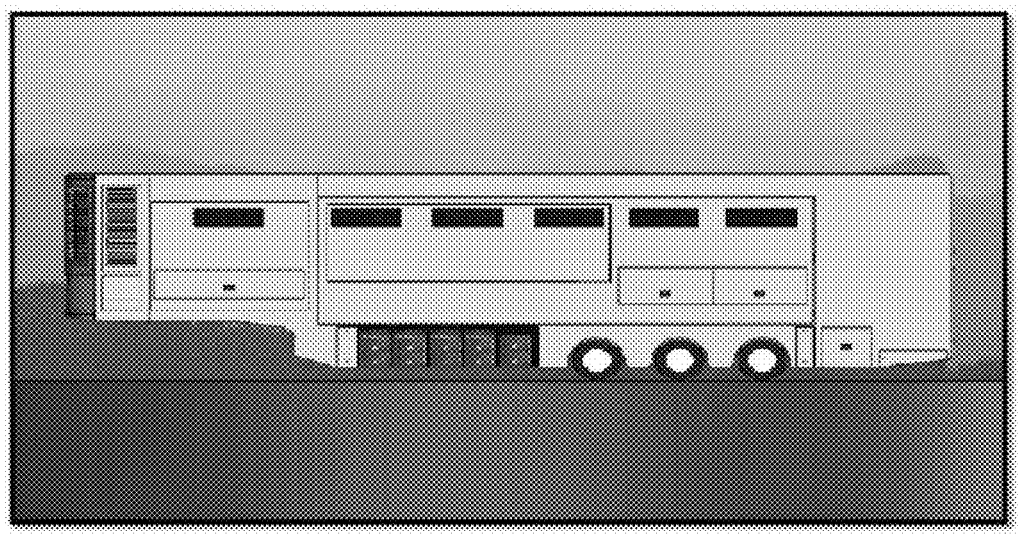
Figure 34:
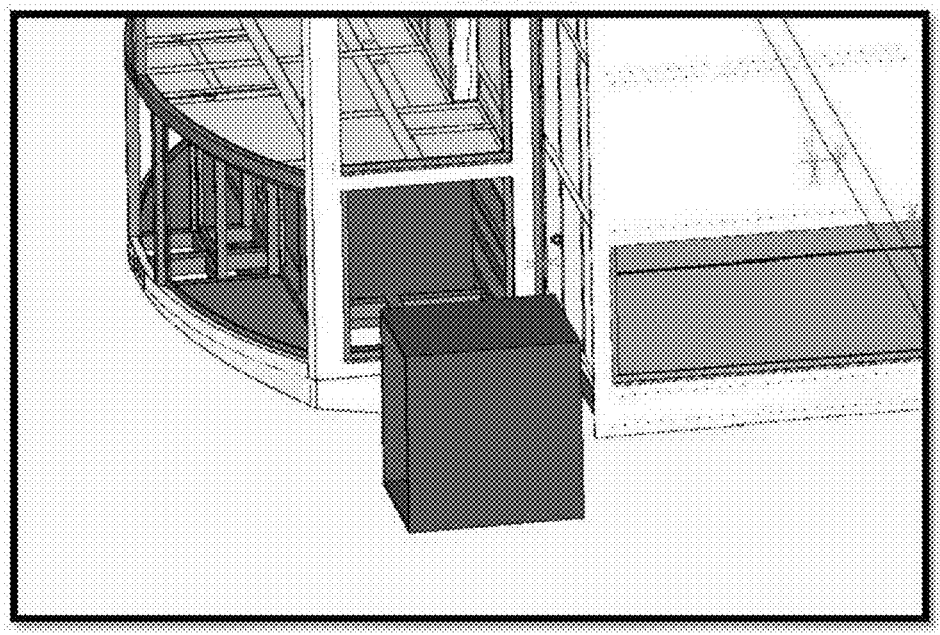
Figure 35:
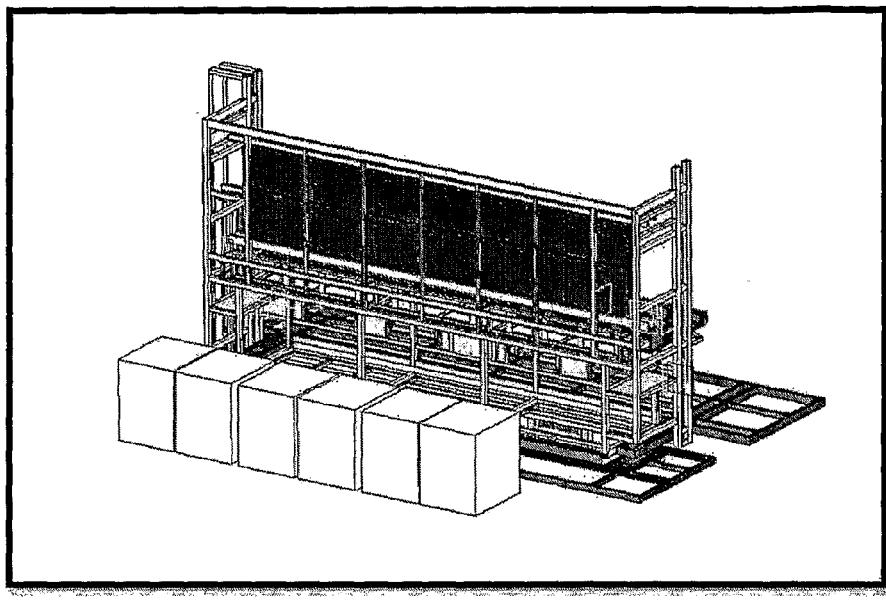
Figure 35:
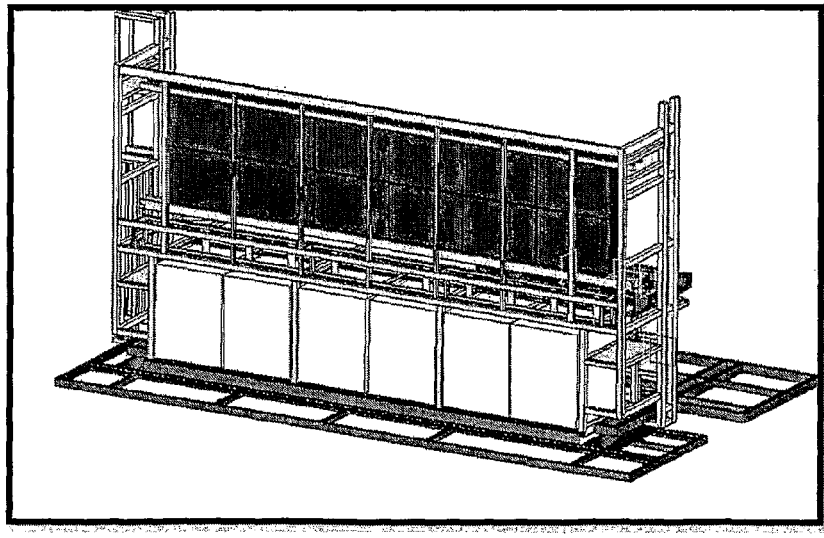

With reference to FIGS. 28 and 29, the vehicle for the mobile control room further comprises a lifting system associated to a base of said second and third areas, and such that to bring said base in a first lower position for uploading a respective module from the outside of the vehicle, and such that to bring said base in a second upper position in order to locate the aforesaid module inside the respective housing area.

Figure 36:
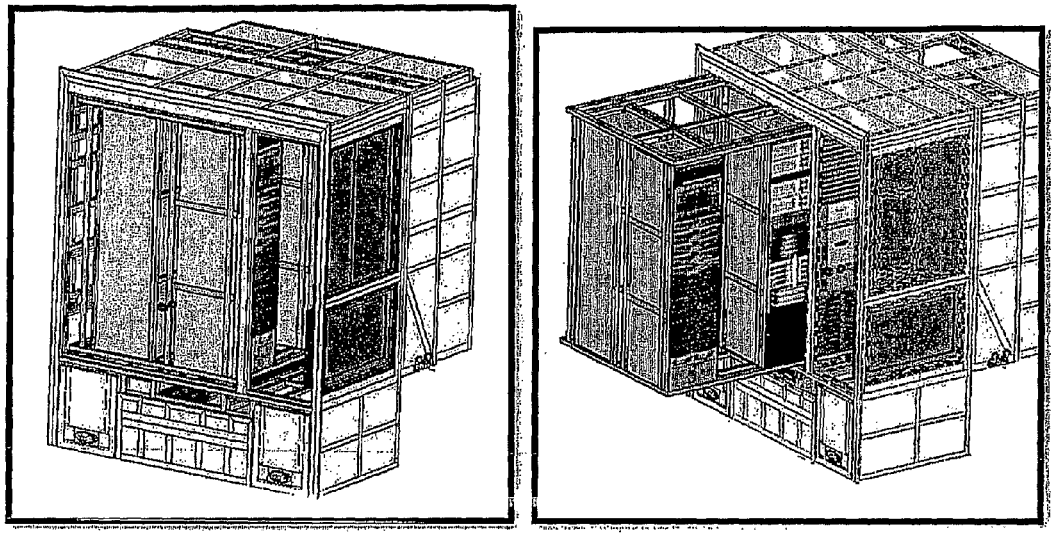
FIGS. 36-37: show the vehicle comprised at the inside thereof an area configured for housing the central control module kernel.
Figure 36:
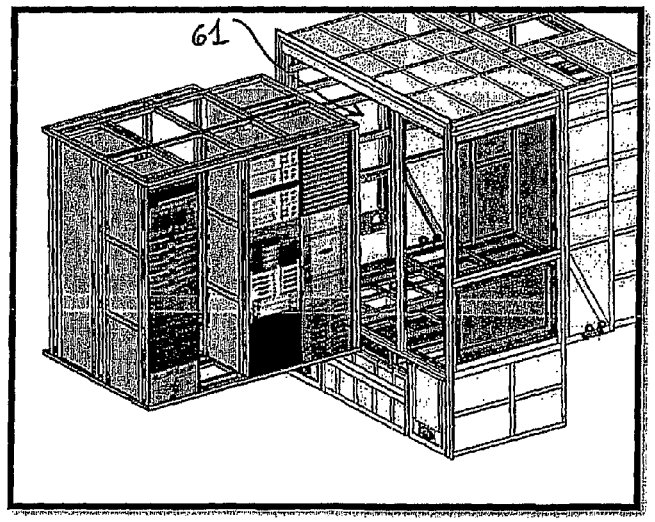
Figure 37:
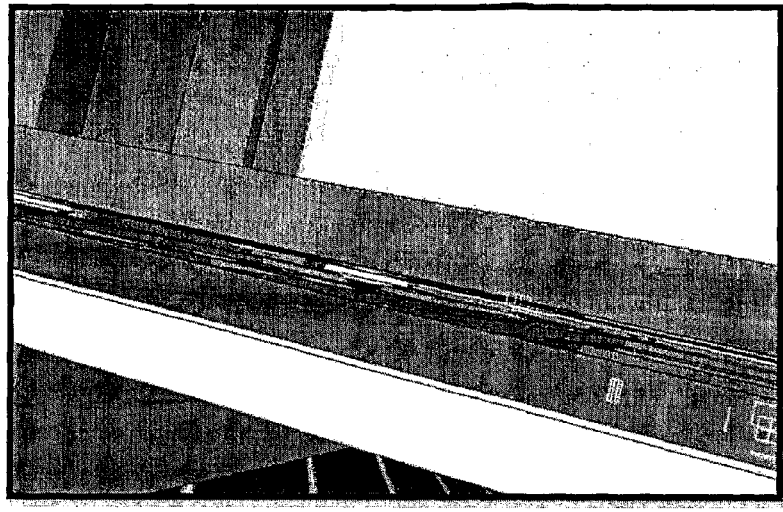
Figure 37:
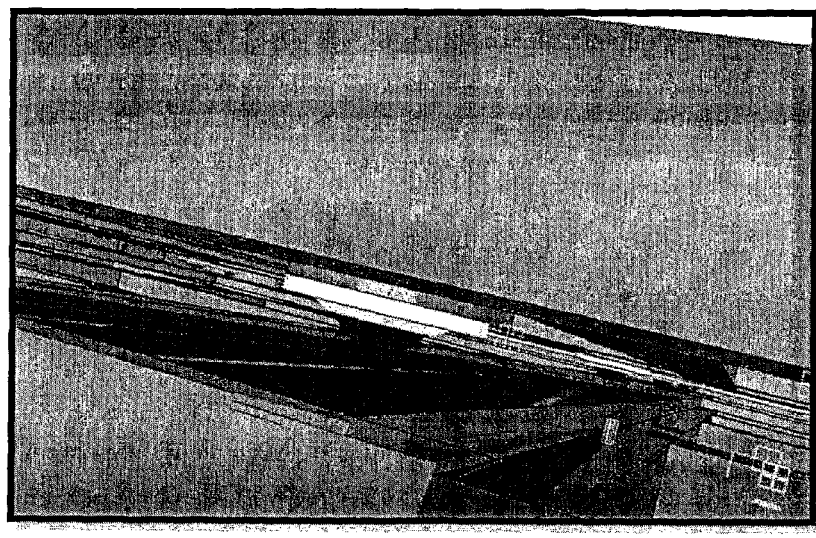
Figure 38:
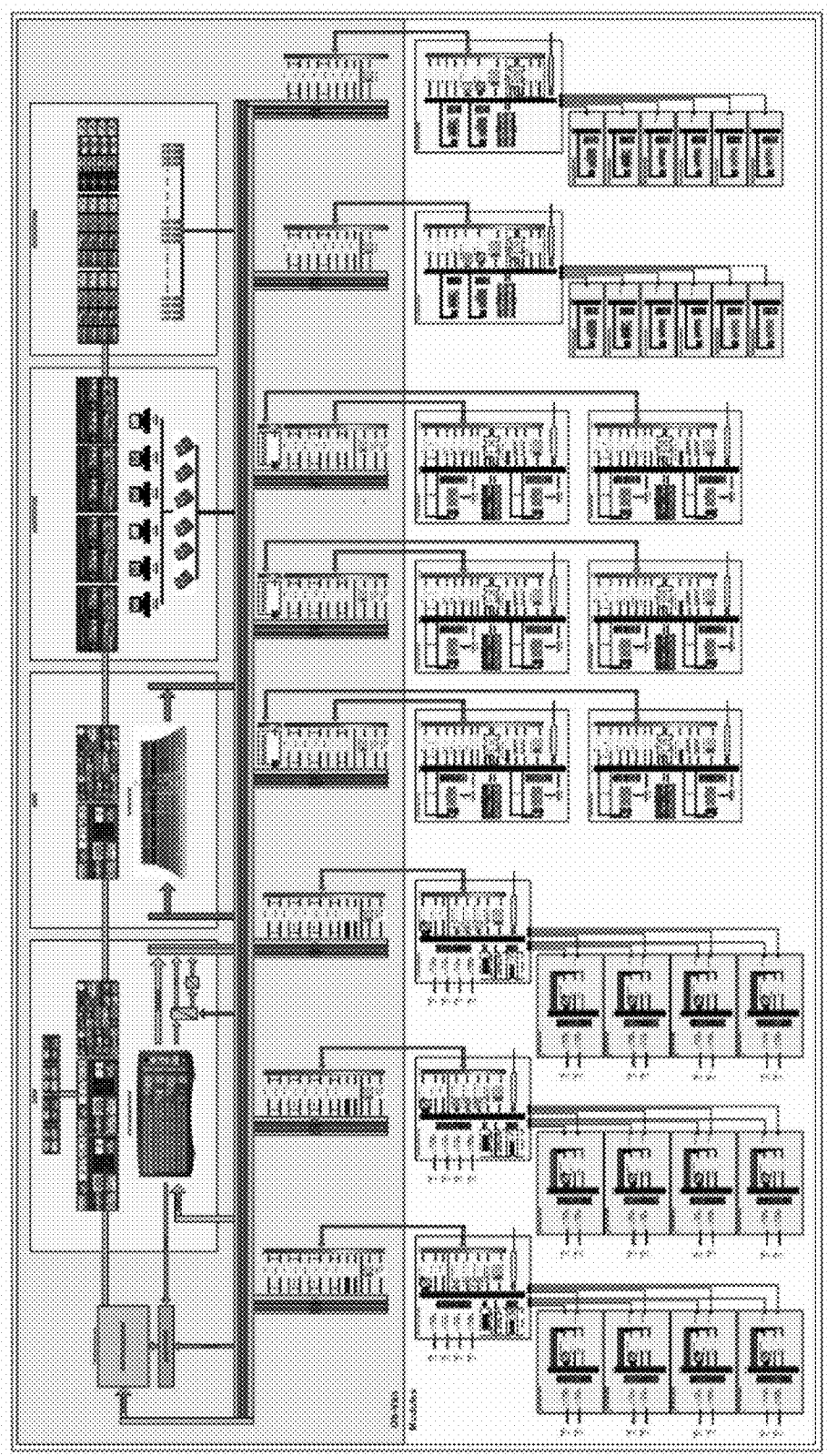
FIGS. 38-50: show a non-limiting example of a preferred embodiment of block diagrams of the modular apparatus for the mobile control room.
Figure 39:
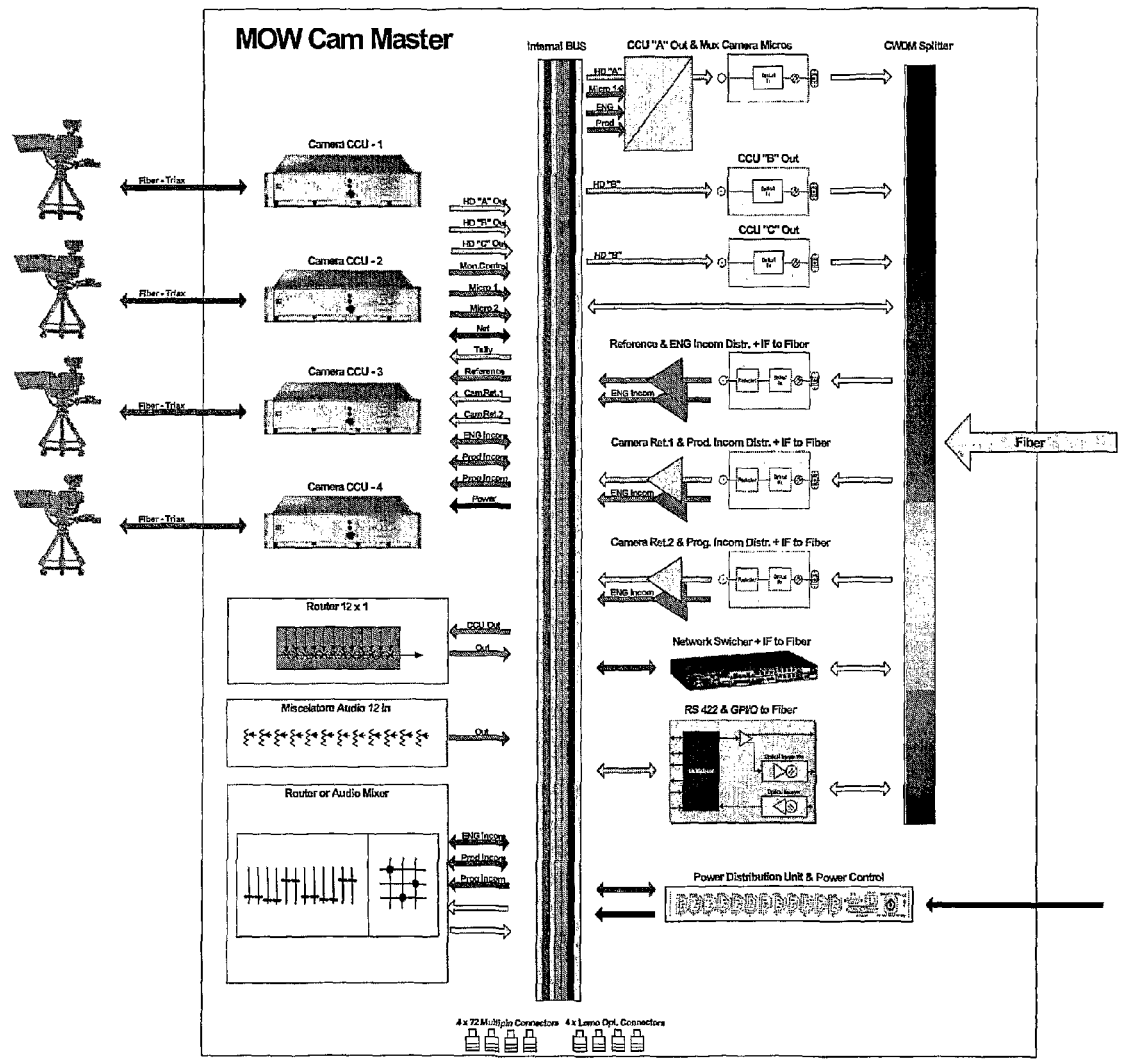
Figure 40:
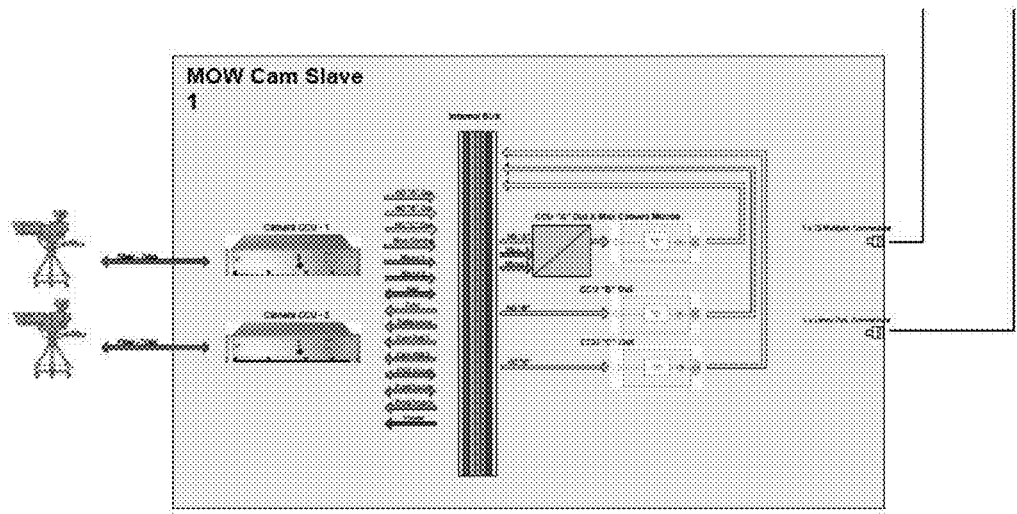
Figure 41:
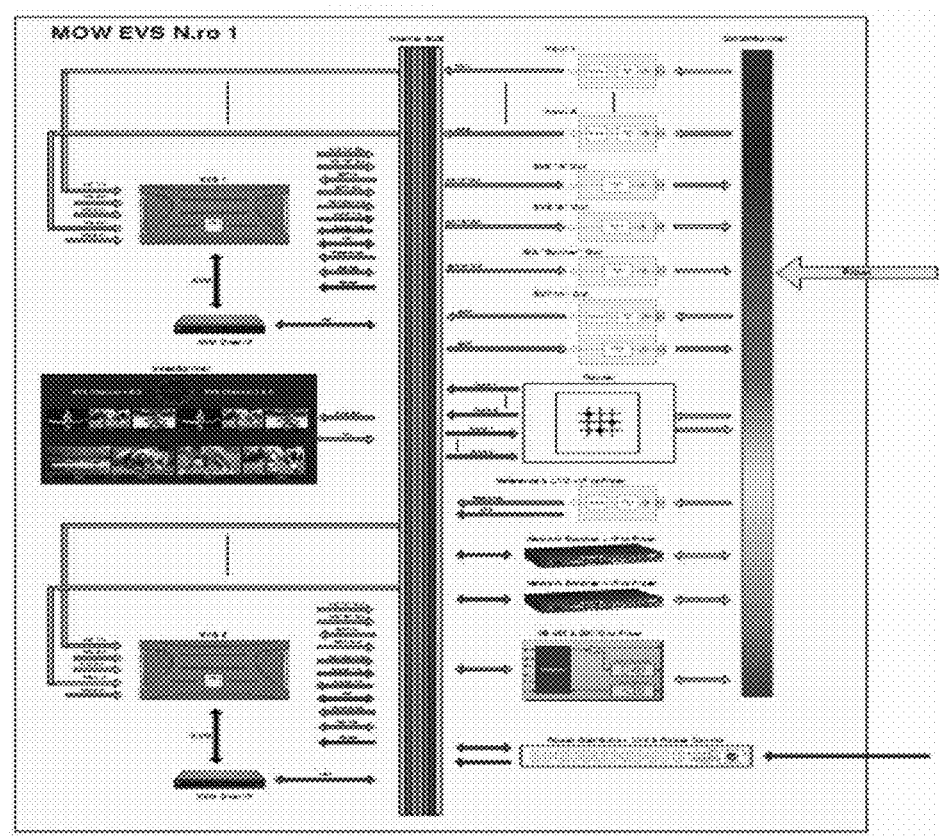
Figure 42:
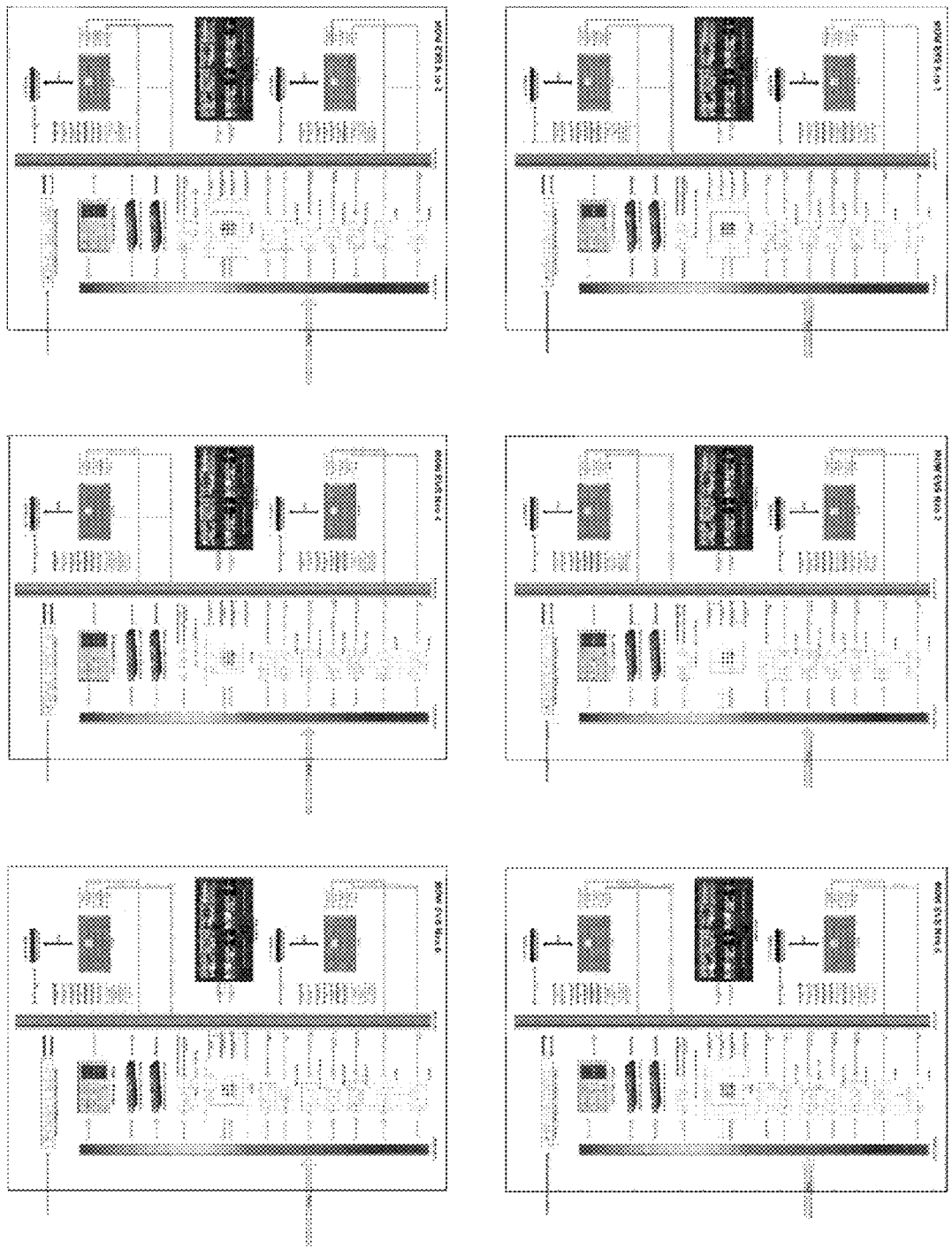
Figure 43:
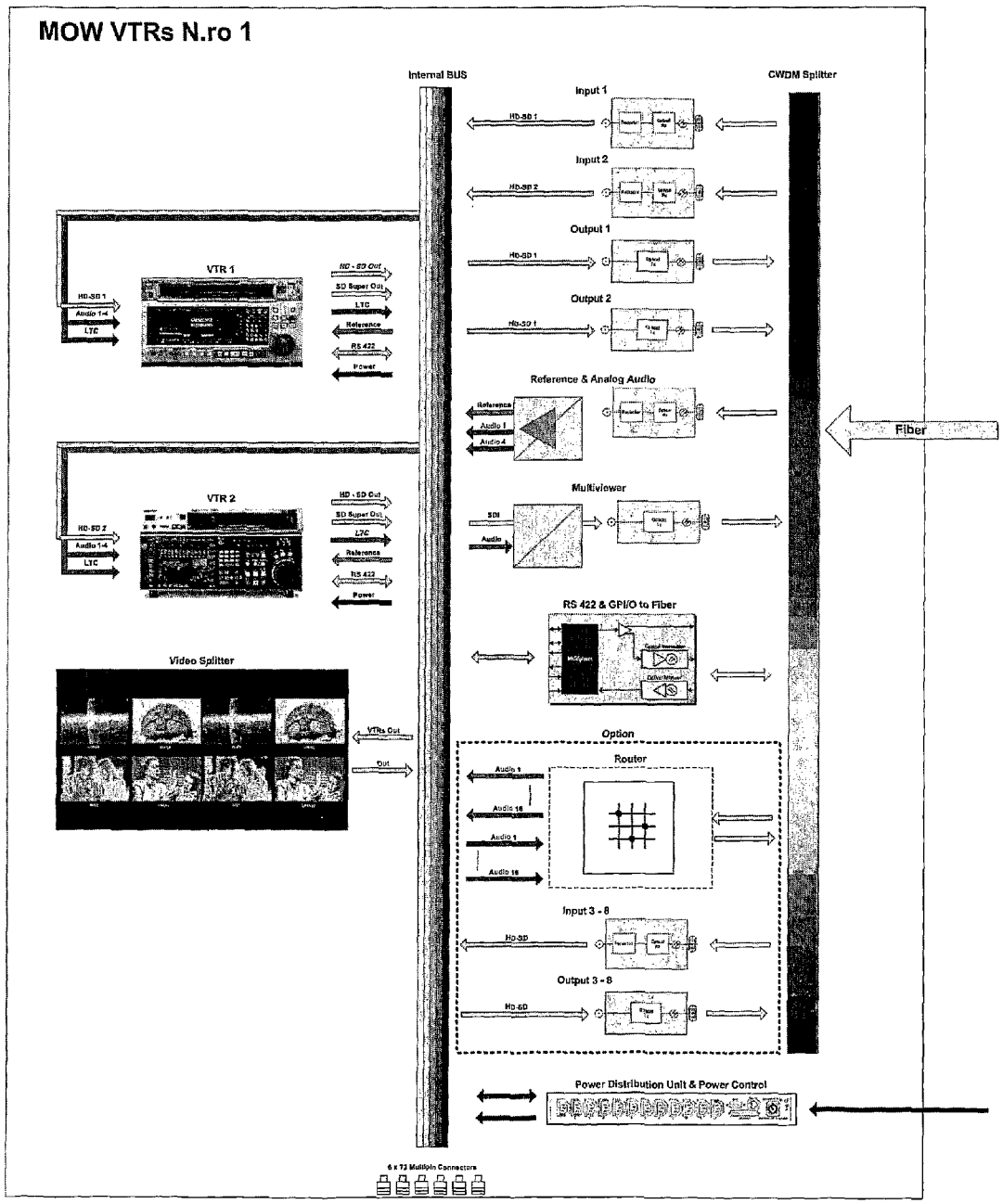
Figure 44:
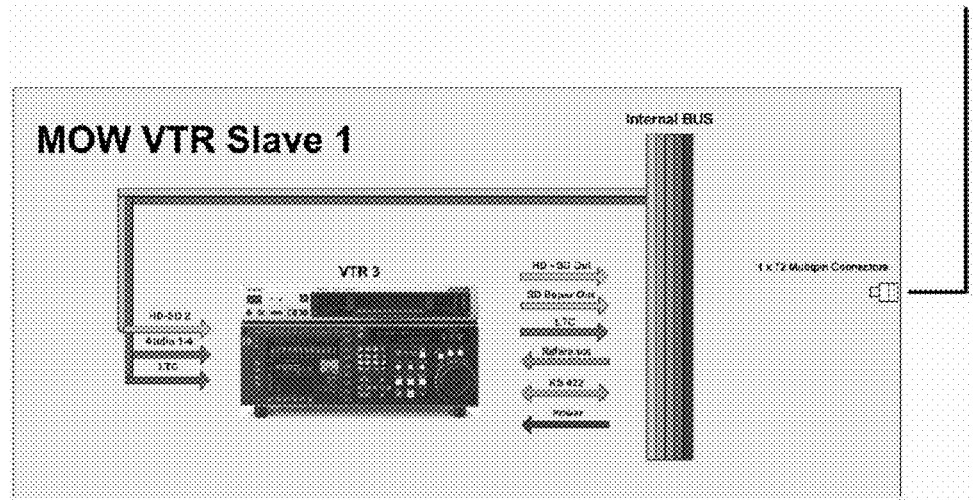
Figure 45:
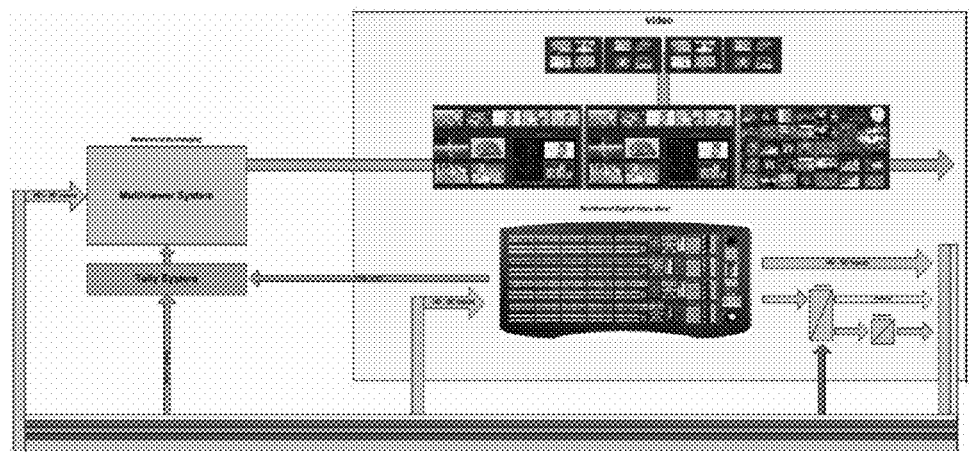
Figure 46:
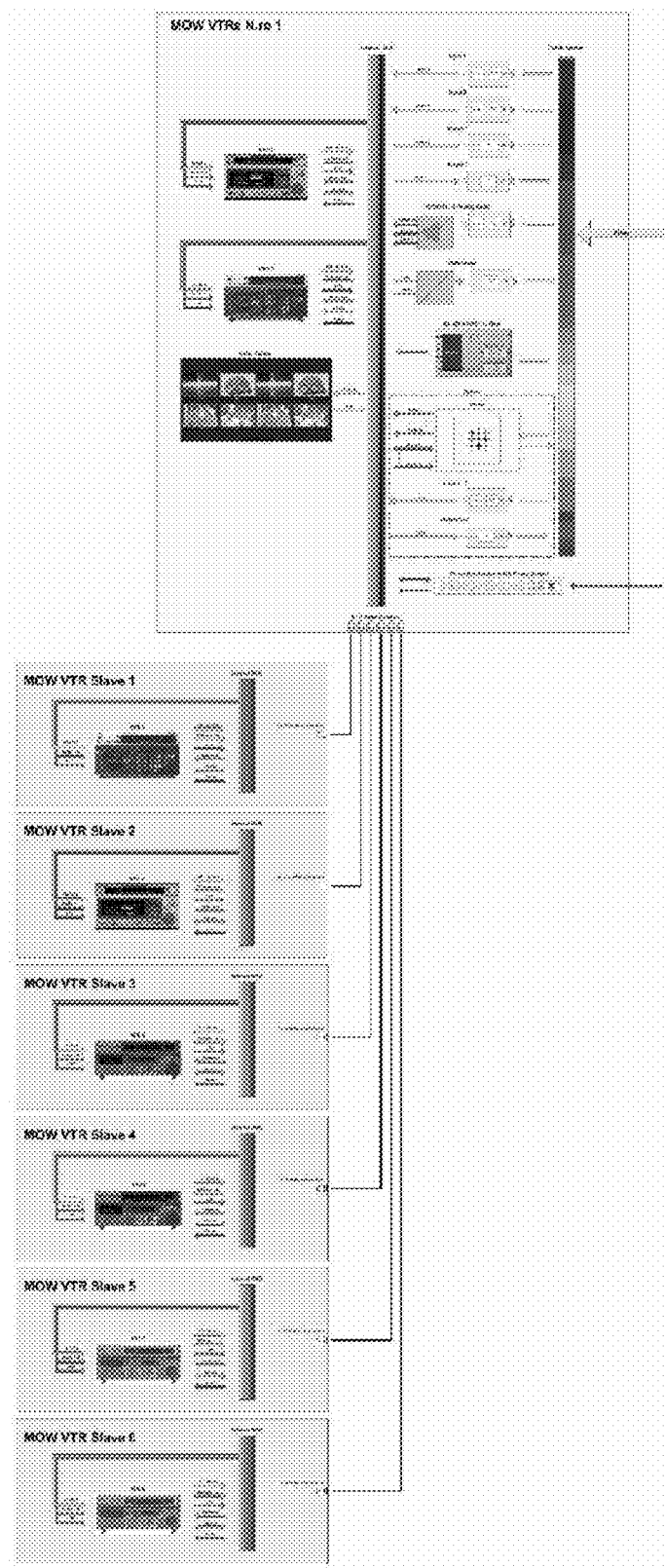
Figure 47:
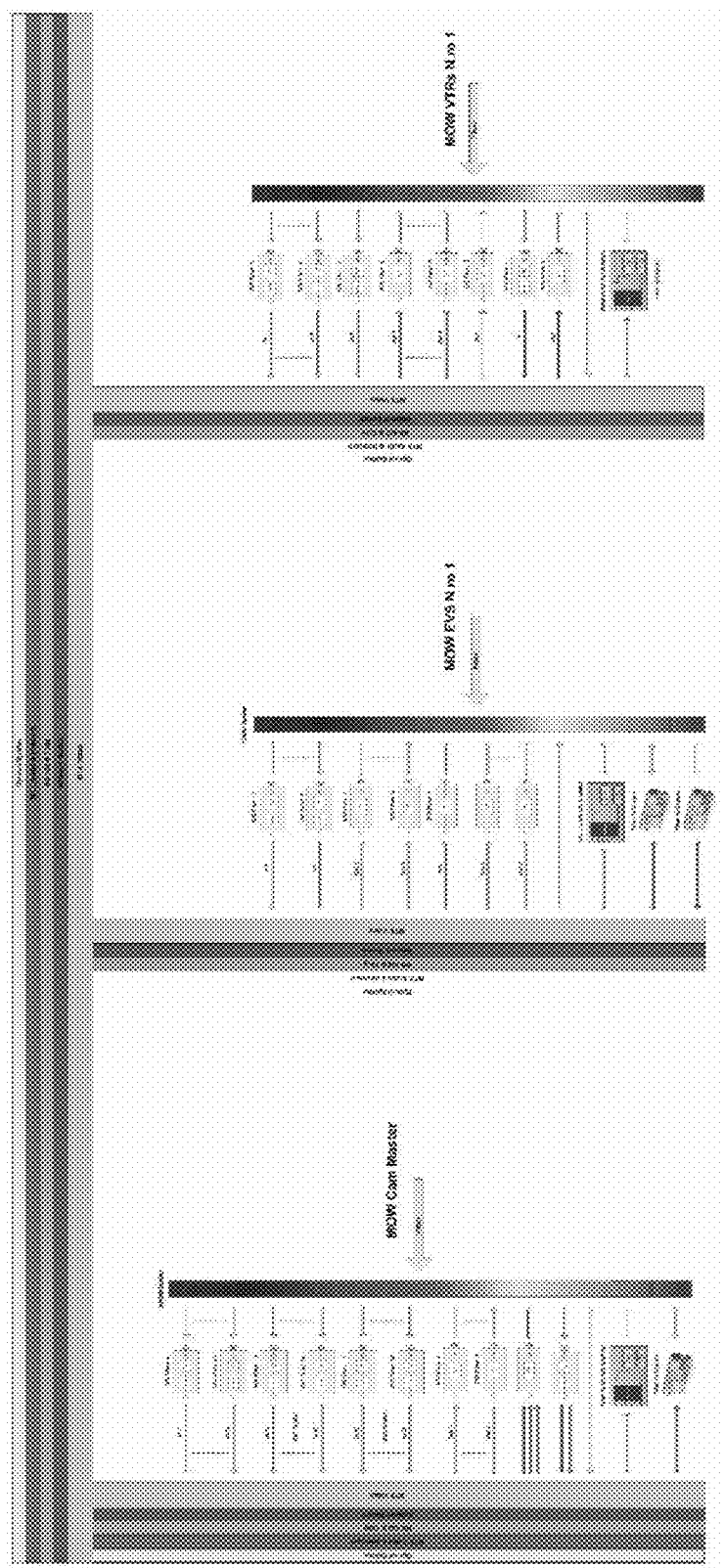
Figure 48:
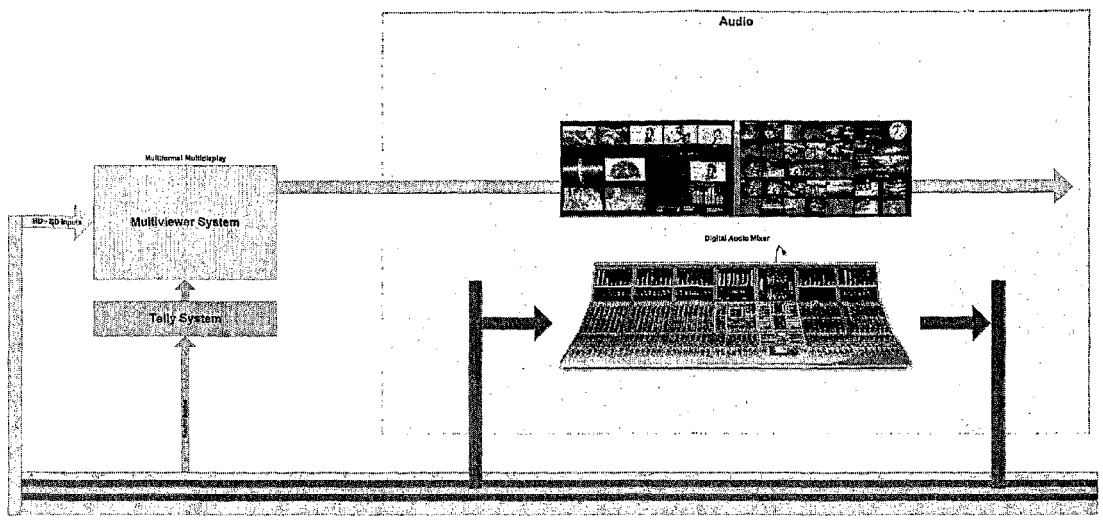
Figure 49:
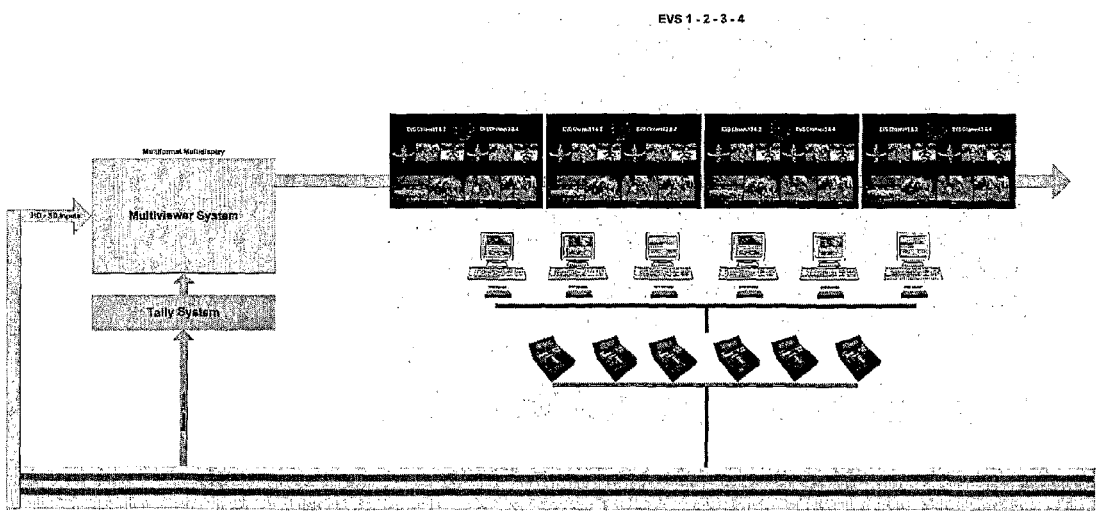
Figure 50:
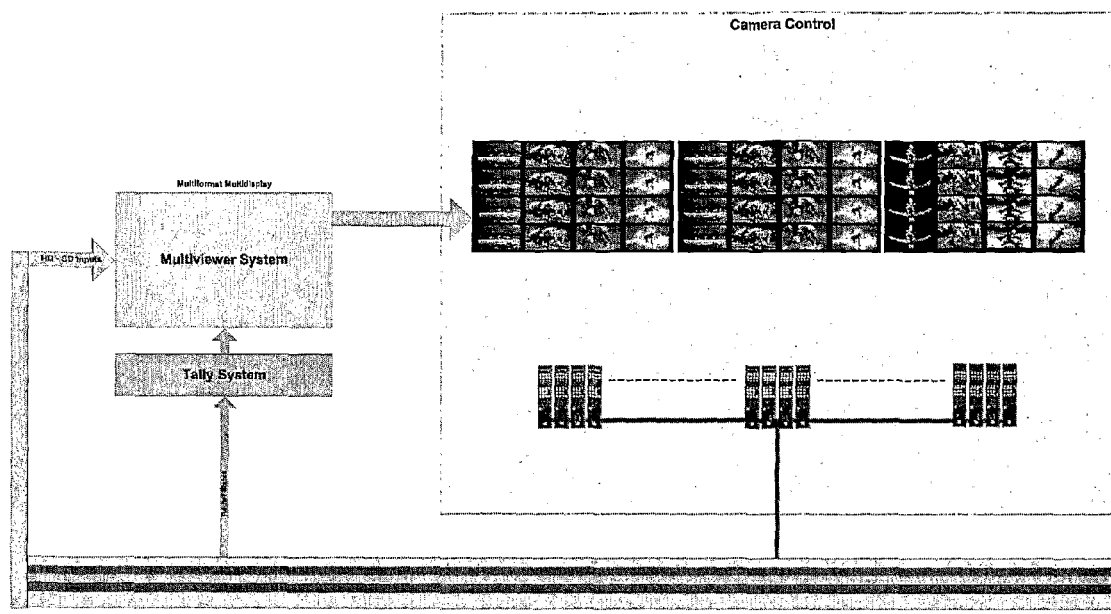

With reference particularly to FIGS. 36 and 37, the vehicle comprises at the inside thereof an area 61 configured for housing the central control module kernel 60. The area 61 further comprises at a base thereof means for the moving of the module 60 inside thereof.

FIGS. 38-50 show as a non limiting example a preferred embodiment of block diagrams of the modular apparatus for a mobile control room according to the present invention.

Figure 51:
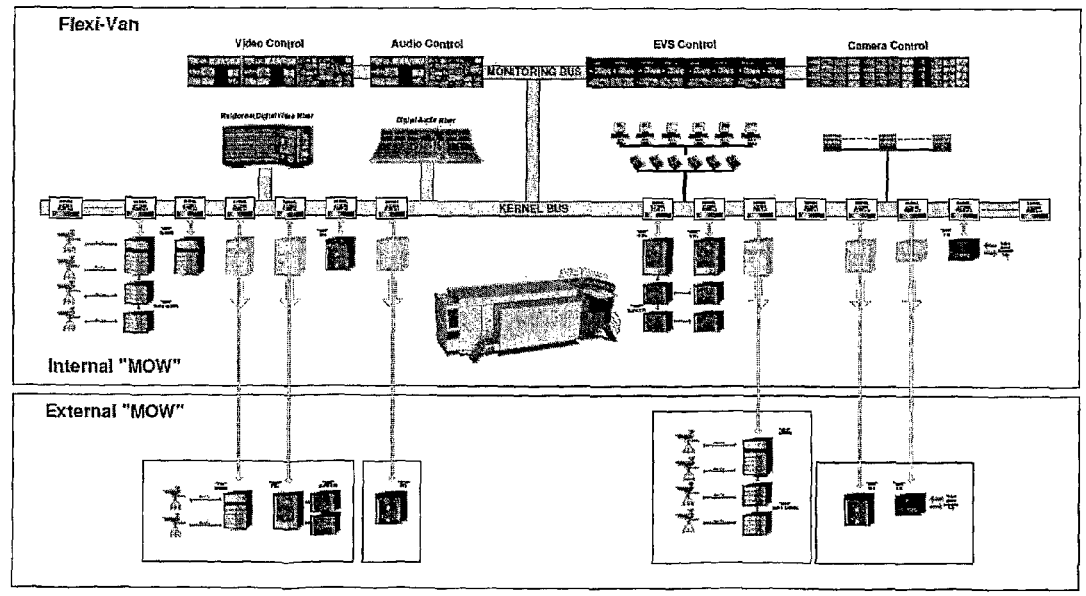
FIGS. 51-52: show an overall diagram of the modular apparatus.
Figure 52:
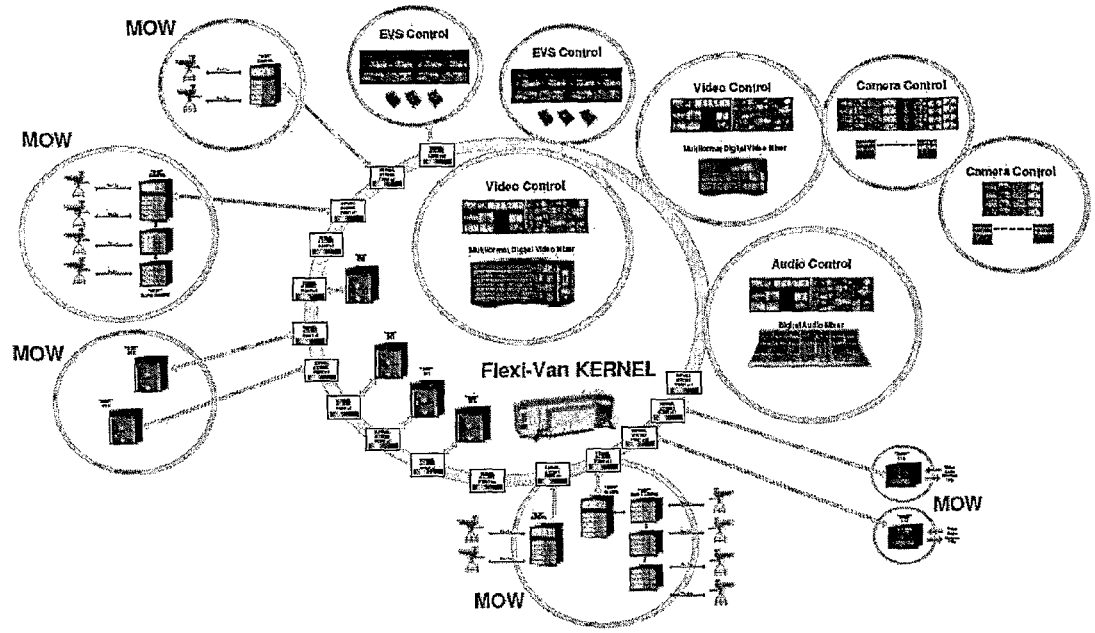
Figure 53:
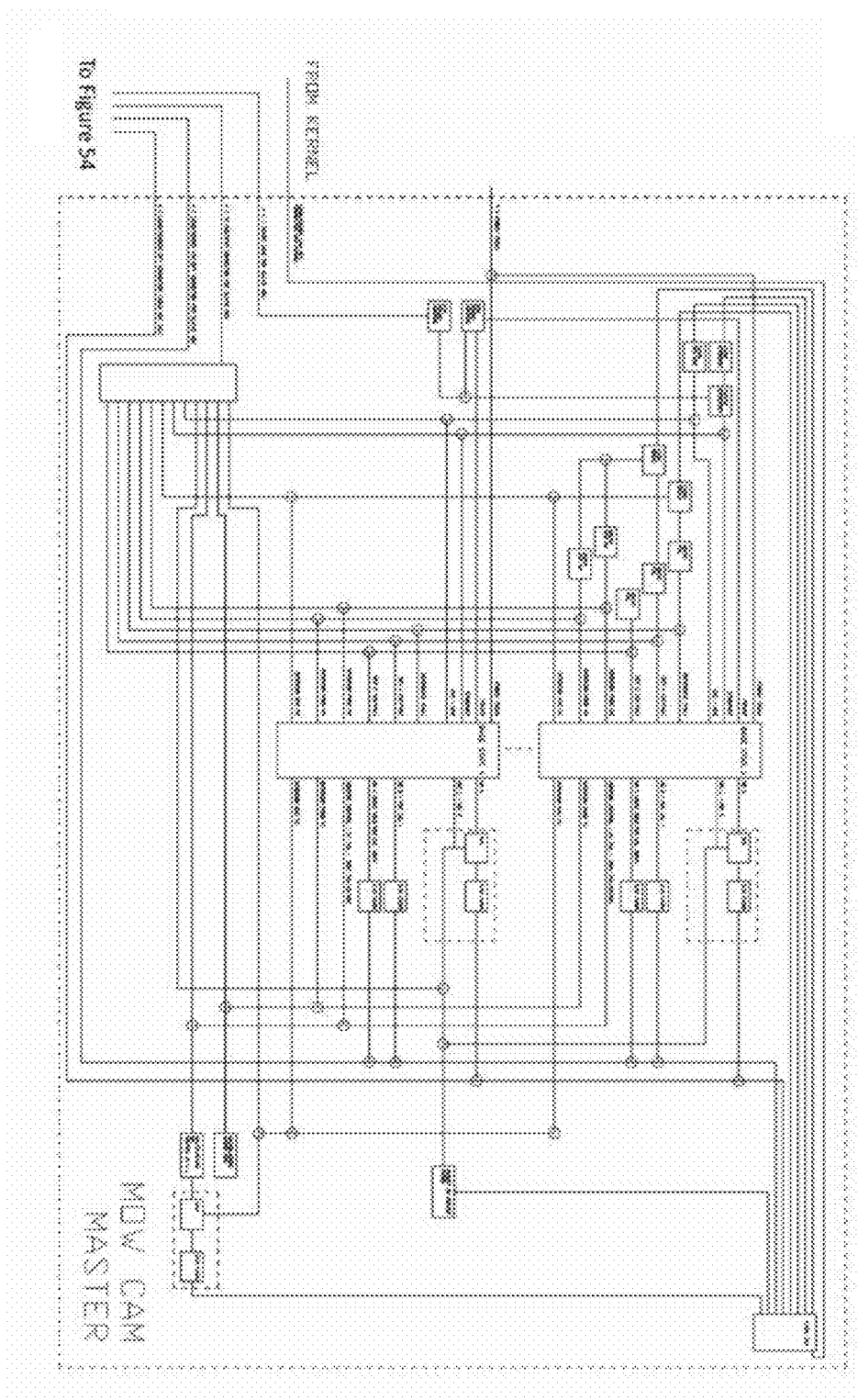
FIGS. 53-61: show a non-limiting example wiring diagrams of the modular apparatus.
Figure 54:
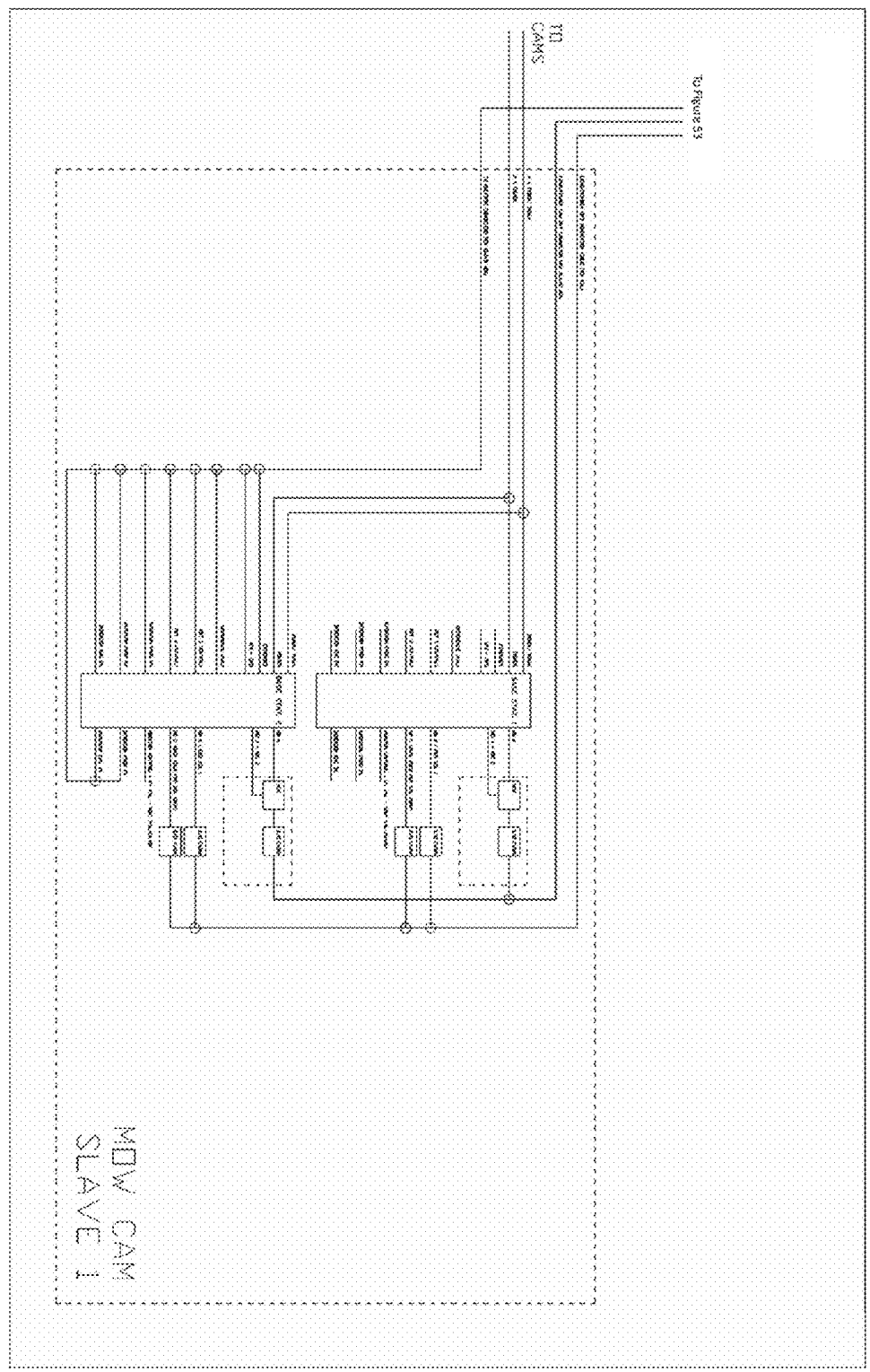
Figure 55:
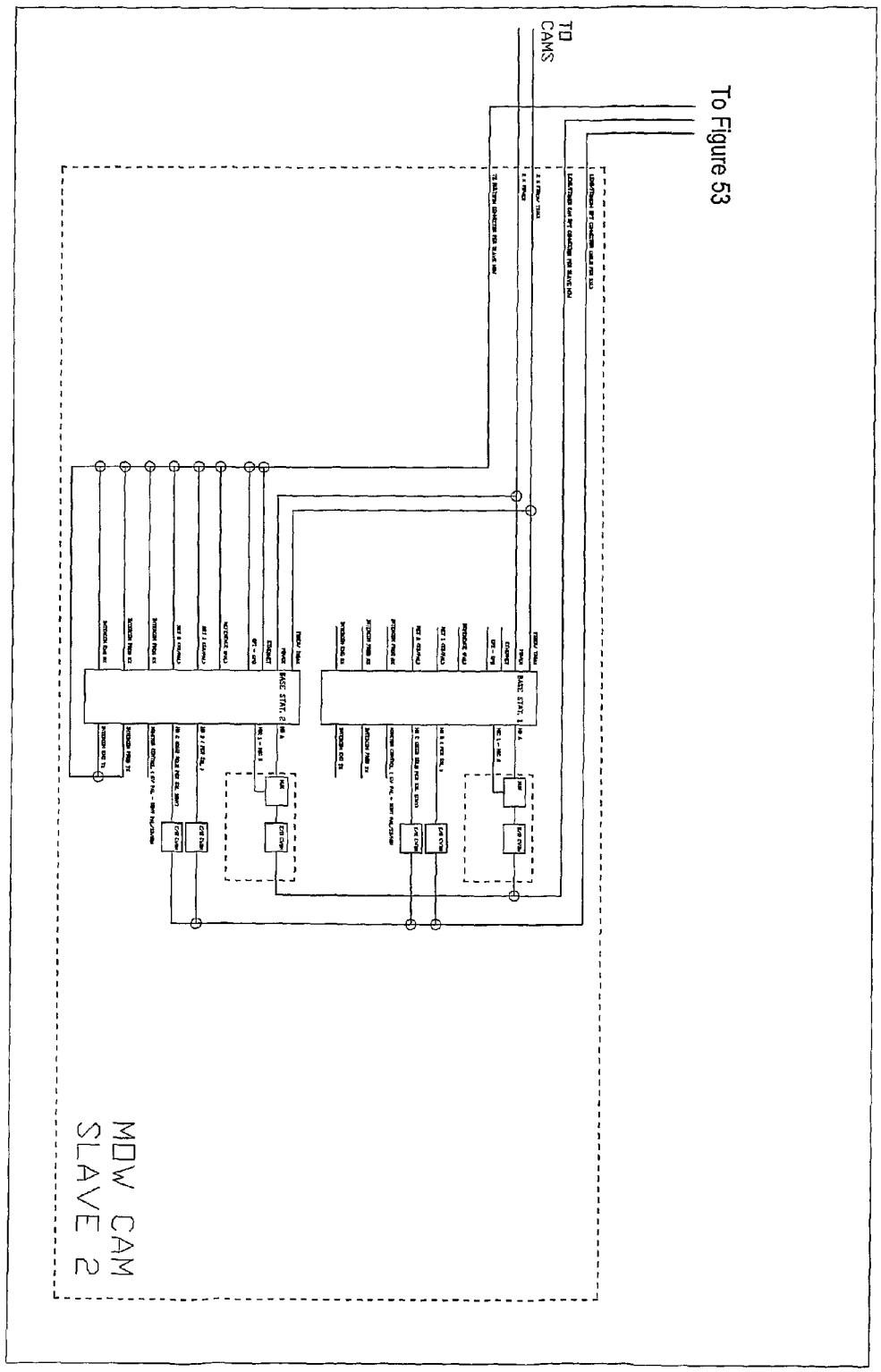
Figure 56:
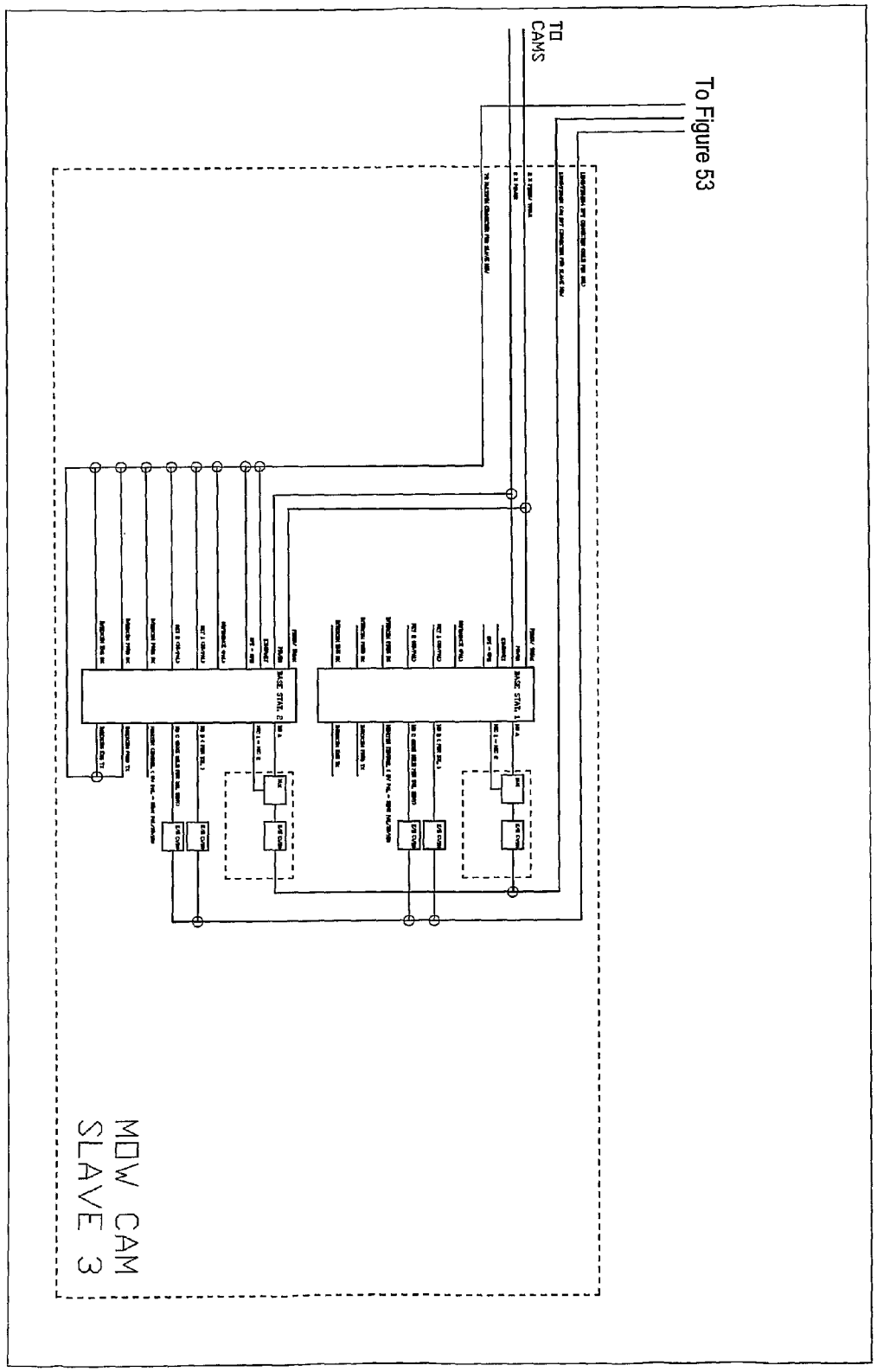
Figure 57:
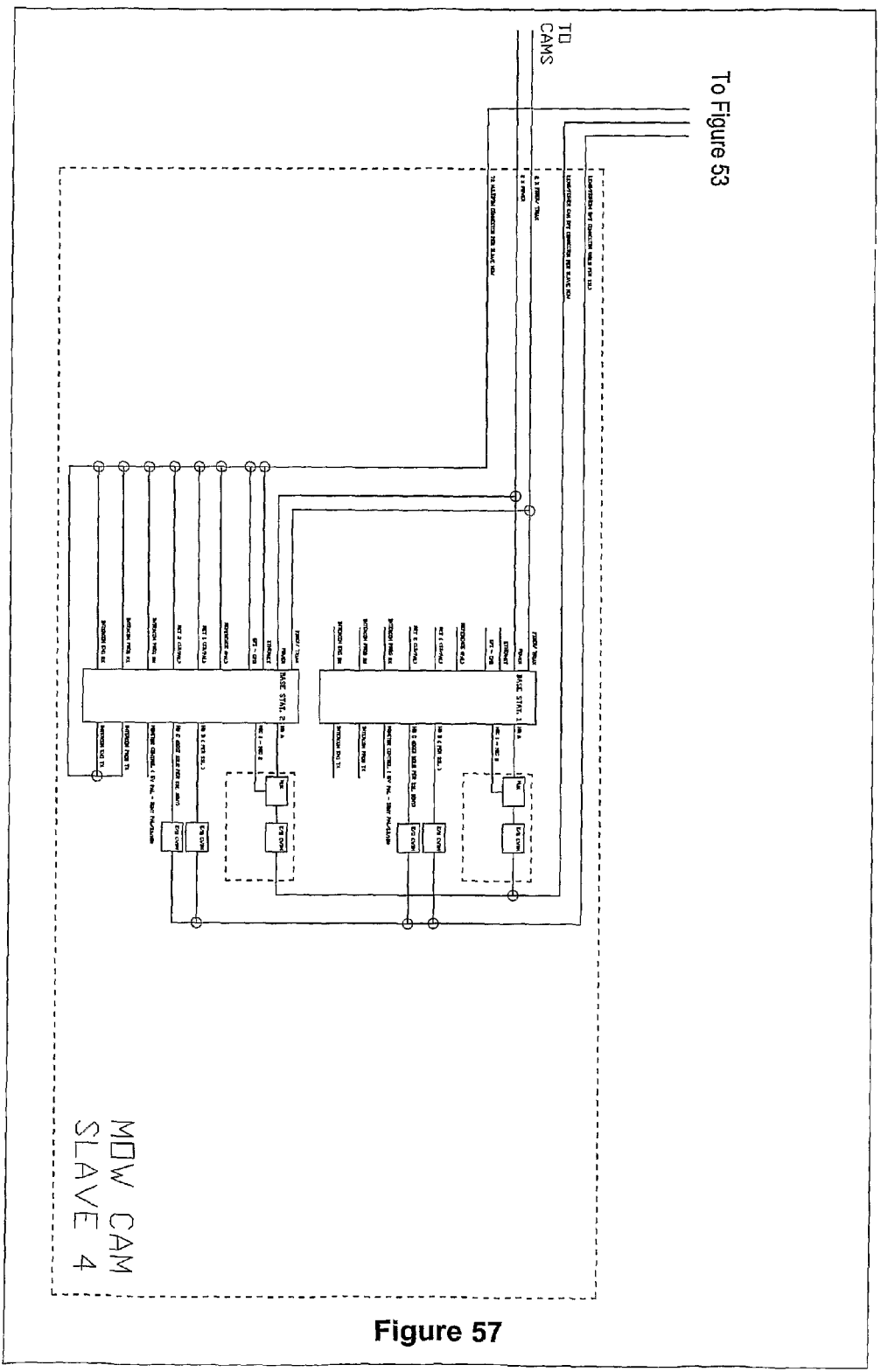
Figure 58:
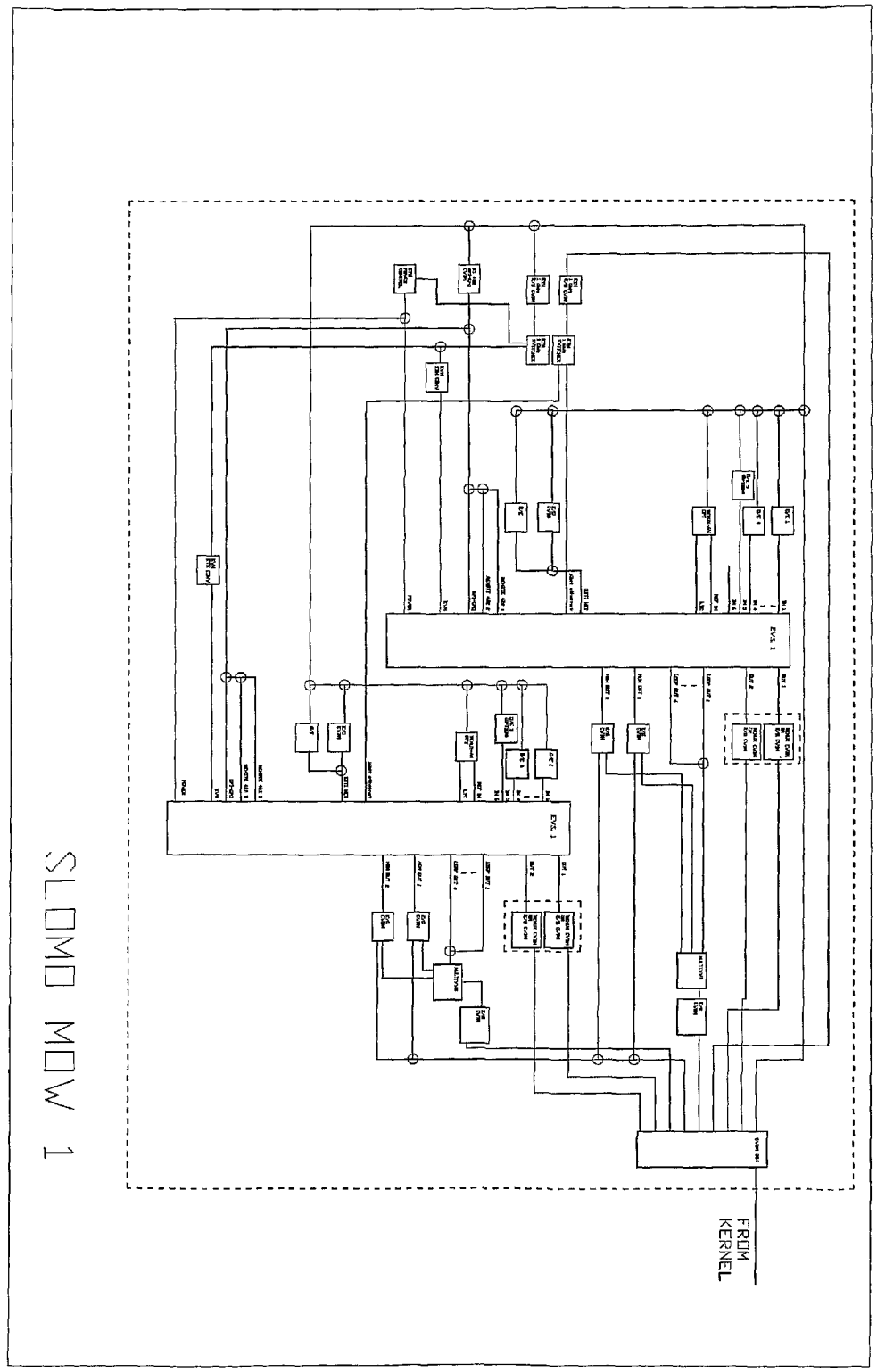
Figure 59:
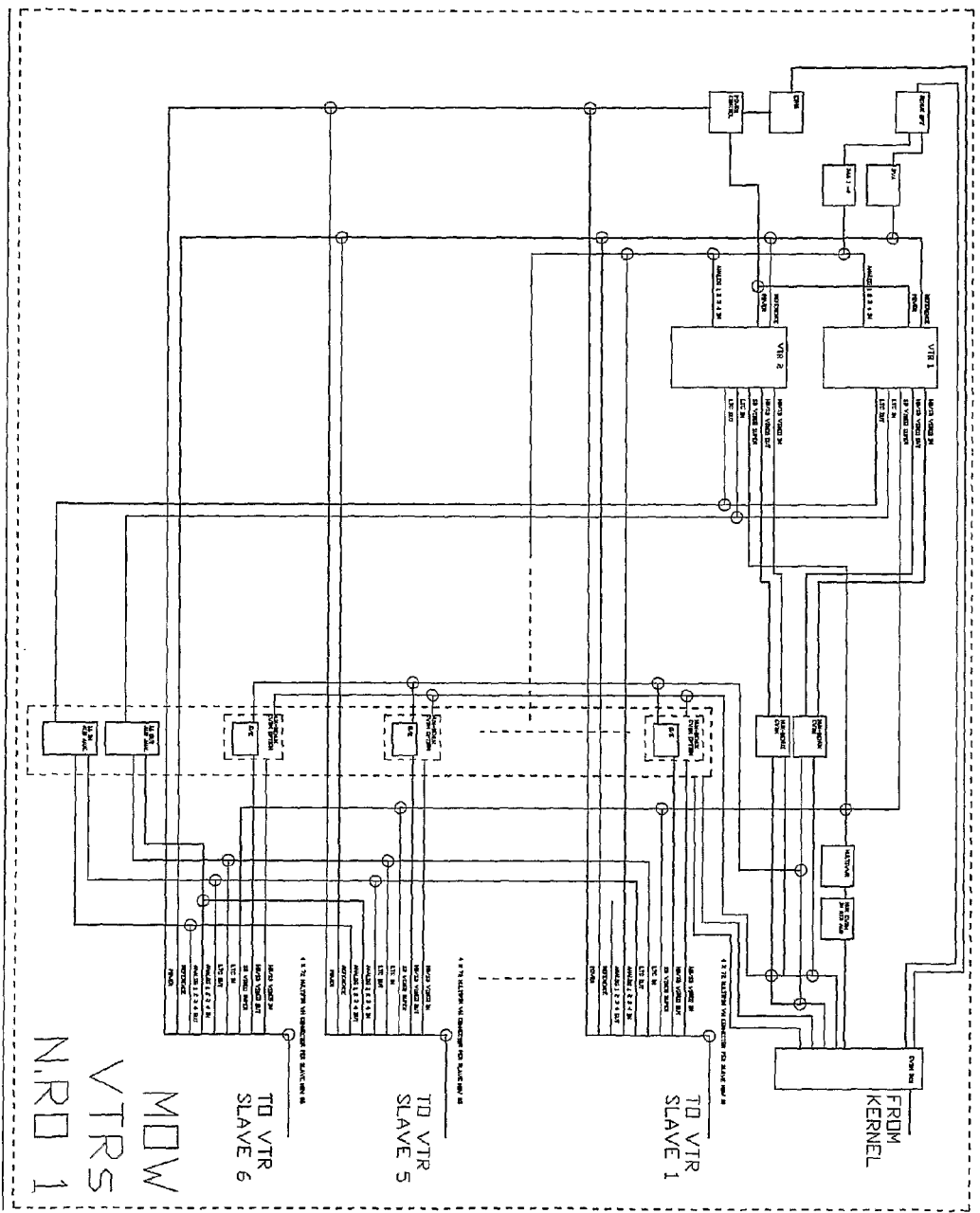
Figure 60:
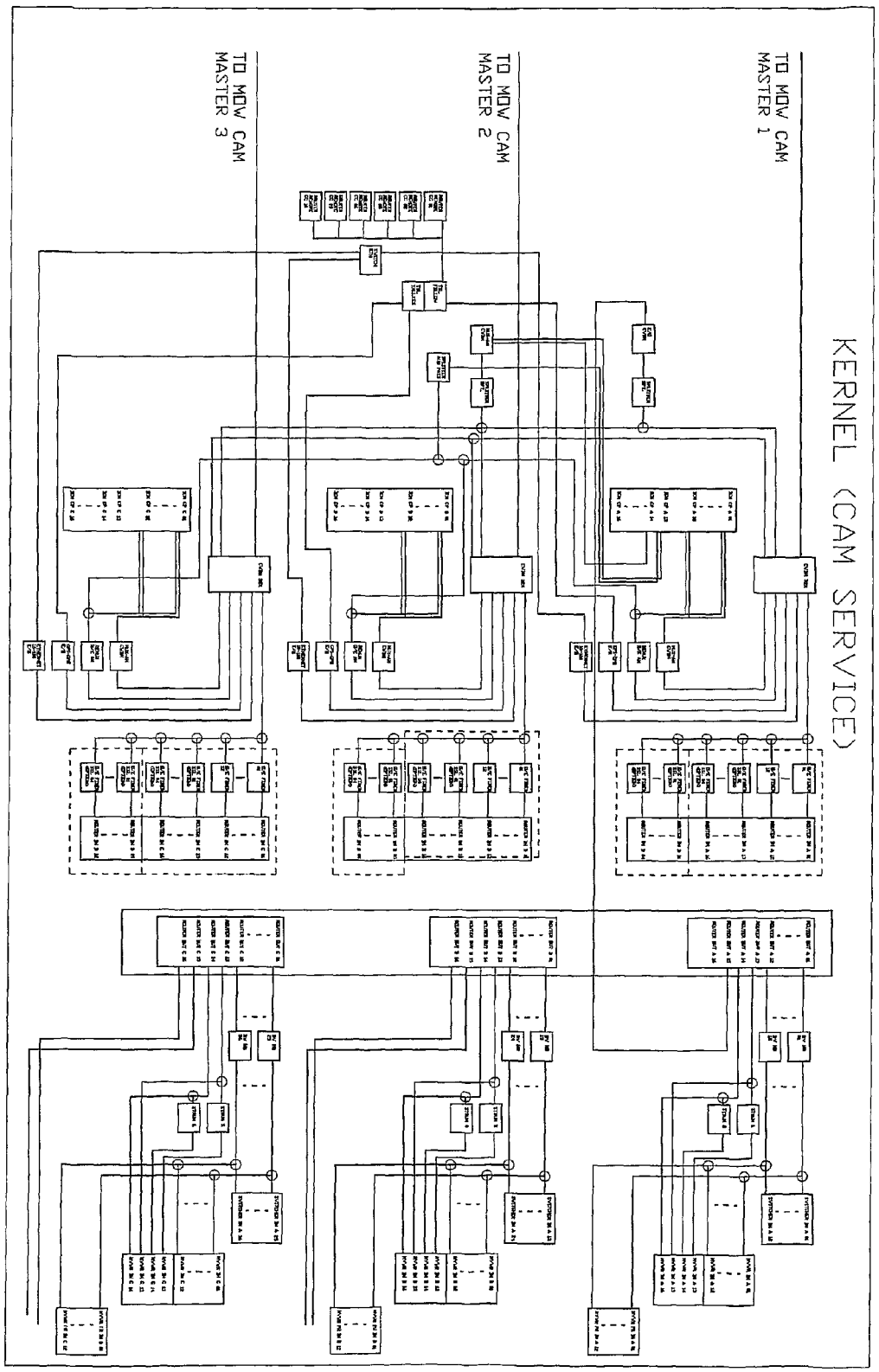
Figure 61:
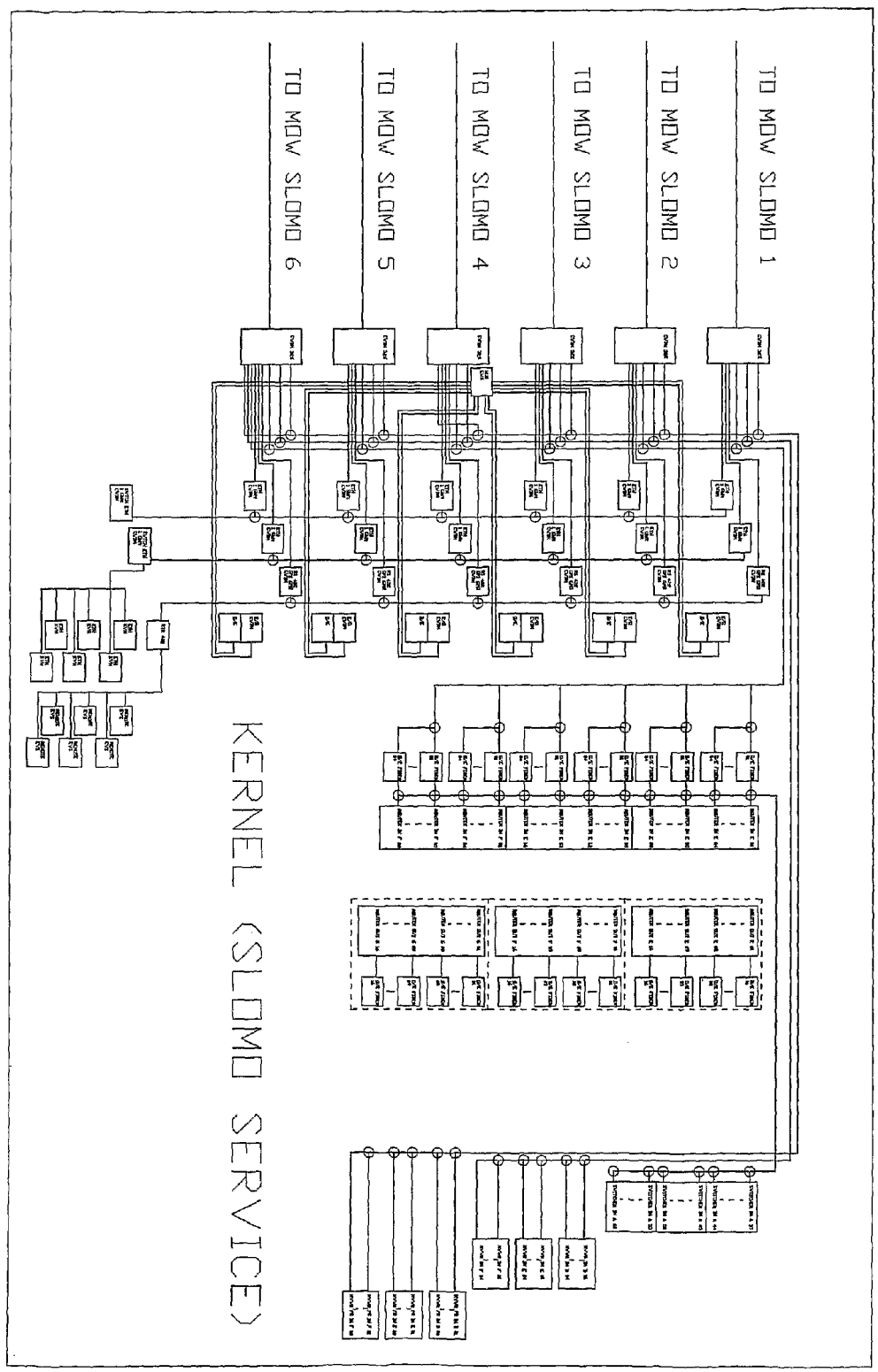

FIGS. 51 and 52 show an overall diagram of the modular apparatus of the present invention, whilst FIGS. 53-61 show as a non limiting example wiring diagrams of the modular apparatus of the present invention.

The present invention has been herewith disclosed with reference to preferred embodiment thereof. It has to be understood that other embodiments of the same may be provided which refer to the same inventive concept, and all of them comprised within the scope of the annexed claims hereinafter.

The invention claimed is:

1. Modular apparatus for an outside broadcast van (OB-Van), comprising:
   one or more broadcasting systems for a broadcast event, for producing an audio/video signal corresponding to said broadcasted event;
   a central control module, connectable to each of said one or more broadcasting systems and for receiving the corresponding audio/video signal produced from each of said broadcasting systems;
   one or more processing modules of said audio/video signal, each of said one or more modules being connectable only to said central control module for receiving and transmitting said corresponding audio/video signal from/to said central control module,
   a wiring, to be fixed inside the OB-Van, the wiring having a plurality of connection spots for connecting said central control module and said one or more processing modules, said spots accepting a single standard type connector, and
wherein each of said central control module and said one or more processing modules are connectable to said wiring by said single standard type connector at any of said connection spots, and wherein said central control module and said one or more processing modules are housed inside a respective transportable structure such that said modular apparatus is configured to be assembled in a brick configuration.

2. The modular apparatus according to claim 1, wherein each of said one or more broadcasting systems comprises at least one video camera connected to a respective processing cam master module of said corresponding audio/video signal, said respective processing cam master module being connectable to said central control module by way of a single connector and adapted to be housed in said OB-Van.

3. The modular apparatus according to claim 2, wherein each of said one or more broadcasting systems comprises a first group of video cameras, each video camera of said first group of video cameras being connected to said respective processing cam master module.

4. The modular apparatus according to claim 3, wherein each broadcasting system comprises at least a second group of video cameras, each video camera of said second group of video cameras being connected to a respective module cam slave, said respective module cam slave being connected to said processing cam master module according to a Master-Slave connection and being adapted to be housed within said OB-Van.

5. The modular apparatus according to claim 1, wherein said one or more processing modules comprise a module slow comprising means for producing the audio/video signal corresponding to the broadcasted event at different speeds.

6. The modular apparatus according to claim 1, wherein said one or more processing modules comprise a recording module, said recording module comprising means for the recording of said audio/video signal corresponding to broadcasted event onto a memory support.

7. The modular apparatus according to claim 1, wherein at least one of said one or more processing modules comprises means for the transmission of direction control signals to one or more of the other processing modules and/or said one or more broadcasting systems, for controlling respective treatments of the audio/video signal and/or for varying the broadcasting of said event.

8. The modular apparatus according to claim 1, further comprising a module I/O, said module I/O being connectable to said central control module by way of a single connector and comprising receive-transmit means for connecting to outer networks from the apparatus.

9. The modular apparatus according to claim 4, wherein said central control module, each cam master module and cam slave module and each of said one or more processing modules are housed each one inside a respective rigid housing, said housing having a substantially parallelepiped shape and comprising means for the transportation thereof.

10. The modular apparatus to claim 9, wherein said means for the transportation comprises at least one wheel located at a base of said rigid housing.

11. An OB-Van configured to house the modular apparatus according to claim 1.

12. The OB-Van according to claim 11, comprising a compartment for the housing of said central control module.

13. The OB-Van according to claim 12, wherein said compartment comprises means for the moving of said central control module at the base thereof.

14. The OB-Van the claim 11, comprising first niches each adapted to house a respective processing module, second niches each adapted to houseing a respective processing module cam master, and third niches each adapted to house a respective module slave mow, and a fourth niche for the housing of a I/O module of the modular apparatus.

15. The OB-Van according to claim 14, further comprising a lifting system associated to a base of at least a niche, said lifting system driving said base in a first lower position for uploading a respective module from the outside of the OB-Van, and driving said base in a second upper position in order to locate the aforesaid module inside the respective housing area.

16. A processing module cam master of an audio/video signal corresponding to a broadcasted event, for being used in the modular apparatus according to claim 1.

17. A processing module cam slave of an audio/video signal corresponding to a broadcasted event, for being used in the modular apparatus according to claim 1.

18. A processing module of an audio/video signal corresponding to a broadcasted event, for being used in the modular apparatus according to claim 1.

19. A central control module kernel of an audio/video signal corresponding to a broadcasted event, for being used in the modular apparatus according to claim 1.

20. A module I/O comprising means for receive-transmit for connecting to an outside network, for being used in the modular apparatus according to claim 1.

* * * * *